United States Patent
Li et al.

(10) Patent No.: US 12,301,501 B2
(45) Date of Patent: May 13, 2025

(54) CONFIGURATION OF A CONTROL RESOURCE SET AND COMMON SEARCH SPACE FOR INITIAL ACCESS BY LOW TIER USER EQUIPMENT

(71) Applicant: QUALCOMM Incorporated, San Diego, CA (US)

(72) Inventors: Qiaoyu Li, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/597,756

(22) PCT Filed: Aug. 5, 2019

(86) PCT No.: PCT/CN2019/099181
§ 371 (c)(1),
(2) Date: Jan. 21, 2022

(87) PCT Pub. No.: WO2021/022435
PCT Pub. Date: Feb. 11, 2021

(65) Prior Publication Data
US 2022/0271894 A1    Aug. 25, 2022

(51) Int. Cl.
*H04L 5/00* (2006.01)
*H04W 72/0446* (2023.01)
*H04W 72/23* (2023.01)

(52) U.S. Cl.
CPC ....... *H04L 5/0053* (2013.01); *H04W 72/0446* (2013.01); *H04W 72/23* (2023.01)

(58) Field of Classification Search
CPC ..... H04L 5/0053; H04L 5/001; H04L 5/0048; H04L 5/0094; H04W 72/0446; H04W 72/23
See application file for complete search history.

(56) References Cited

U.S. PATENT DOCUMENTS

| | | | |
|---|---|---|---|
| 10,701,734 B2 * | 6/2020 | Shih | H04W 74/0833 |
| 11,902,973 B2 | 2/2024 | Bagheri et al. | |
| 2018/0279135 A1 | 9/2018 | Hwang et al. | |
| 2019/0149365 A1 * | 5/2019 | Chatterjee | H04L 25/0226 370/329 |

(Continued)

FOREIGN PATENT DOCUMENTS

| | | |
|---|---|---|
| CN | 103947144 A | 7/2014 |
| CN | 109565390 A | 4/2019 |

(Continued)

OTHER PUBLICATIONS

International Search Report and Written Opinion—PCT/CN2019/099181—ISA/EPO—Apr. 26, 2020.

(Continued)

*Primary Examiner* — Christine Ng
(74) *Attorney, Agent, or Firm* — Harrity & Harrity, LLP

(57) ABSTRACT

Various aspects of the present disclosure relate to wireless communication. In some aspects, a user equipment (UE) may receive a master information block that identifies a first control resource set (CORESET) for a first category of UEs and a first common search space (CSS) associated with the first CORESET. The first CORESET and the first CSS may identify one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS. The UE may monitor for a physical downlink control channel candidate included in the first CORESET and the first CSS.

30 Claims, 14 Drawing Sheets

(56) References Cited

U.S. PATENT DOCUMENTS

| | | | |
|---|---|---|---|
| 2019/0158205 A1 | 5/2019 | Sheng et al. | |
| 2019/0313437 A1* | 10/2019 | Jung | H04W 74/006 |
| 2020/0068512 A1* | 2/2020 | Xue | H04L 27/2657 |
| 2020/0205142 A1* | 6/2020 | Gao | H04W 72/20 |
| 2020/0220703 A1* | 7/2020 | Kim | H04L 27/26 |
| 2021/0051686 A1* | 2/2021 | Liu | H04W 72/53 |
| 2021/0377950 A1* | 12/2021 | Takahashi | H04W 72/23 |
| 2022/0182936 A1* | 6/2022 | Maleki | H04W 52/0219 |

FOREIGN PATENT DOCUMENTS

| | | |
|---|---|---|
| CN | 109952803 A | 6/2019 |
| CN | 110063081 A | 7/2019 |
| WO | 2019099738 A1 | 5/2019 |

OTHER PUBLICATIONS

VIVO: "On The TCI State Configuration for CSS in "Non-Overlapping" BWP", 3GPP TSG-RAN WG2 Meeting #103bis, Tdoc: R2-1815414, Chengdu, China, Oct. 8, 2018-Oct. 12, 2018, 3 Pages, Oct. 8, 2018, (Oct. 12, 2018).

ERICSSON: "On Configuration of Control Resource Sets and Search Space", 3GPP TSG RAN1 WG1 Meeting NR#3, R1-1716578, 3rd Generation Partnership Project, Mobile Competence Centre, 650, Route Deslucioles, F-06921 Sophia-Antipolis Cedex, vol. RAN WG1, No. Nagoya, Japan, Sep. 18, 2017-Sep. 21, 2017, 12 Pages, Sep. 17, 2017, XP051340030, p. 1, Paragraph 2.1-p. 5, Paragraph 2.1.2, p. 6, Paragraph 2.2, p. 7.

Supplementary European Search Report—EP19940399—Search Authority—The Hague—Apr. 5, 2023.

VIVO: "Remaining Issues on Search Space Design", 3GPP TSG RAN WG1 NR Ad Hoc #3, R1-1715629, 3rd Generation Partnership Project, Mobile Competence Centre, 650, Route Des Lucioles, F-06921 Sophia-Antipolis Cedex, France vol. RAN WG1, no. Nagoya, Japan, Sep. 18, 2017-Sep. 21, 2017, Sep. 17, 2017, XP051339096, 9 Pages, Retrieved on Sep. 17, 2017, p. 2-p. 6.

VIVO: "Remaining Issues on Search Space Design", 3GPP TSG RAN WG1 NR Ad Hoc #3, R1-1715629, Nagoya, Japan, Sep. 18, 2017-Sep. 21, 2017, Sep. 12, 2017, pp. 1-9.

* cited by examiner

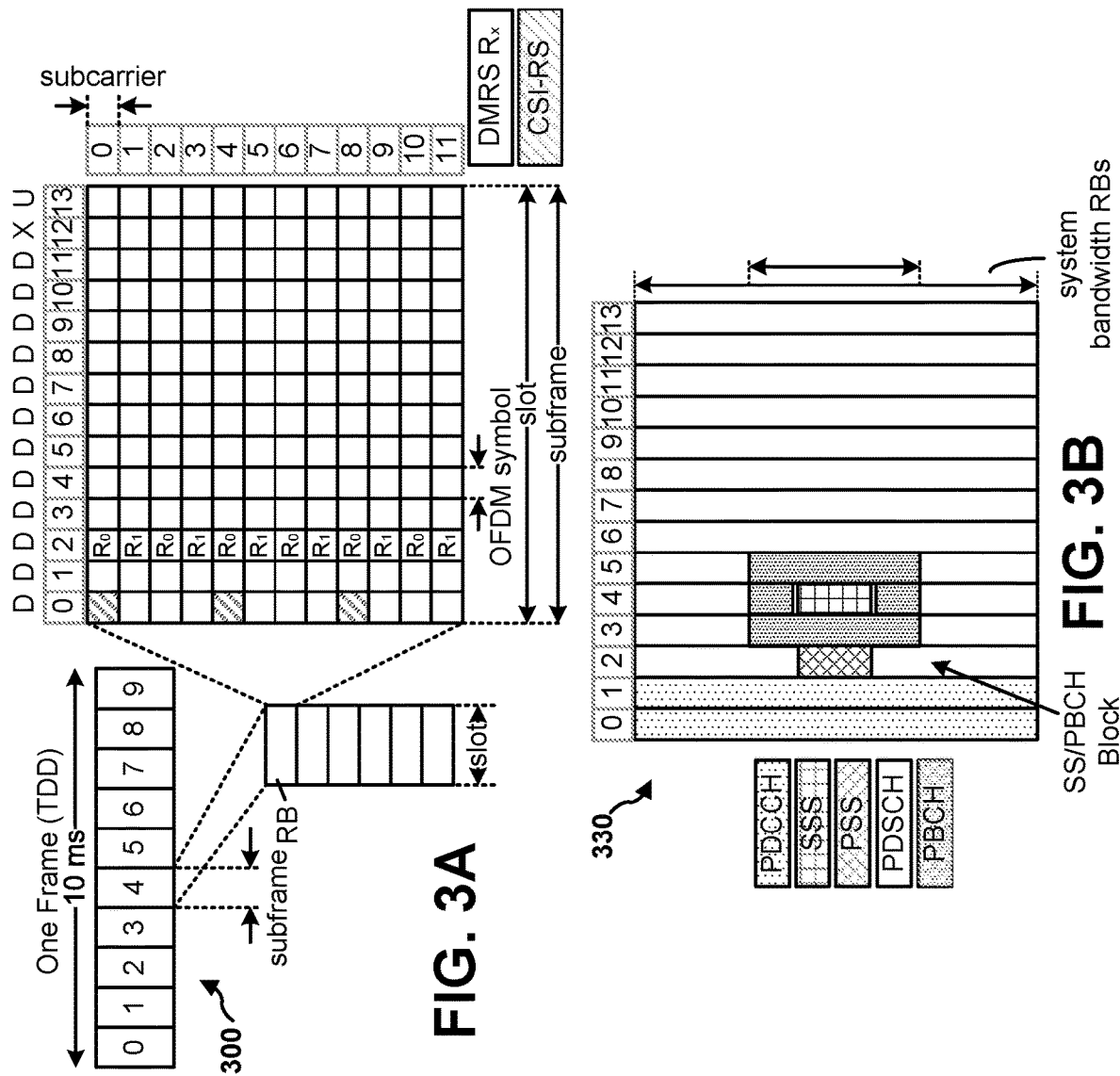

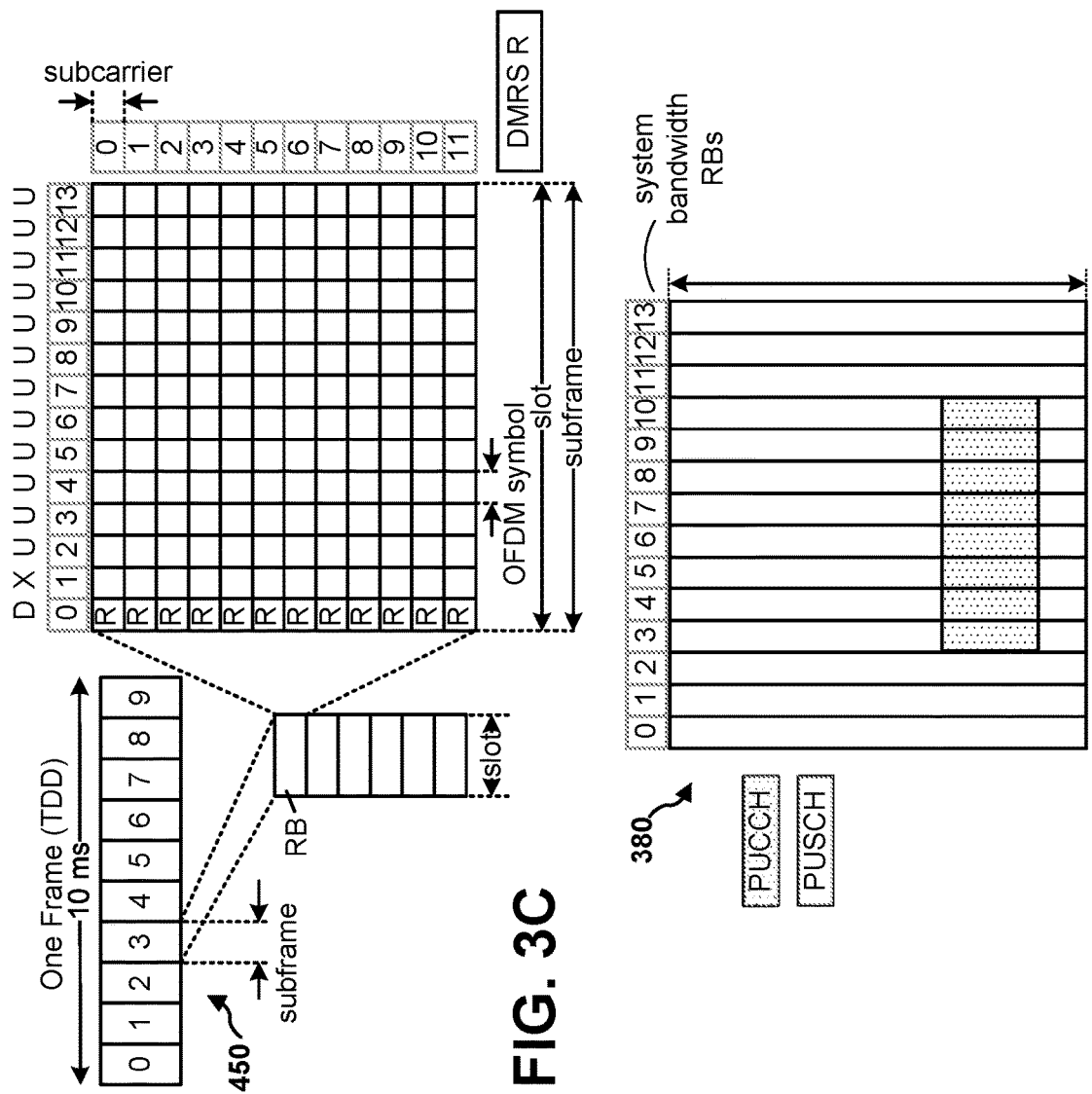

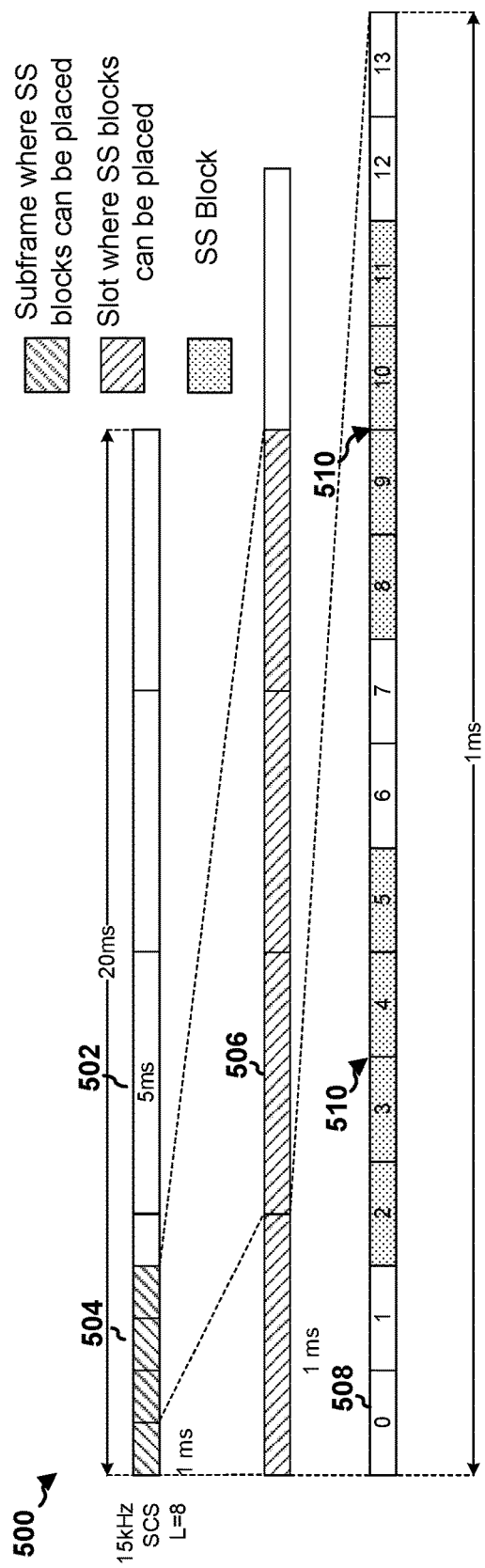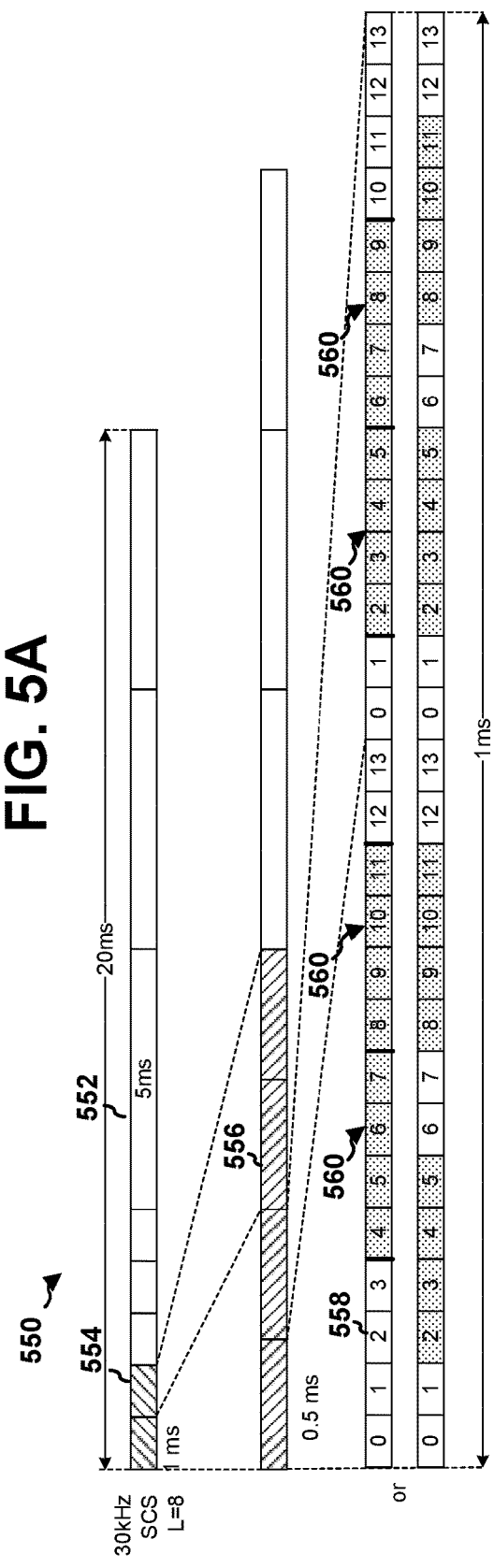
FIG. 5A
FIG. 5B

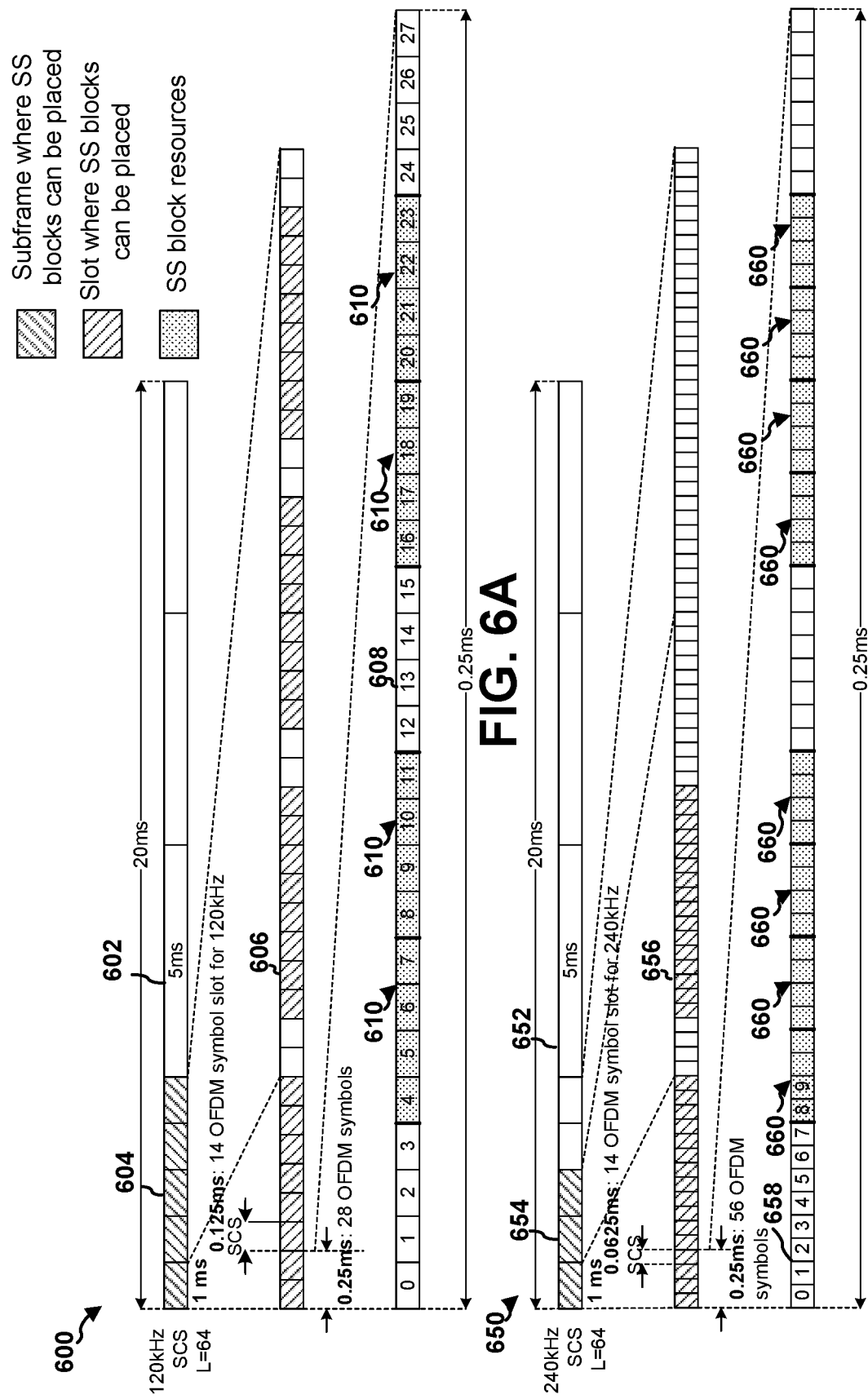

CONFIGURATION OF A CONTROL RESOURCE SET AND COMMON SEARCH SPACE FOR INITIAL ACCESS BY LOW TIER USER EQUIPMENT

CROSS-REFERENCE TO RELATED APPLICATION

This application is a 371 national stage of Patent Cooperation Treaty (PCT) Application No. PCT/CN2019/099181 filed on Aug. 5, 2019, entitled "CONFIGURATION OF A CONTROL RESOURCE SET AND COMMON SEARCH SPACE FOR INITIAL ACCESS BY LOW TIER USER EQUIPMENT," which is hereby expressly incorporated by reference herein.

FIELD OF THE DISCLOSURE

Aspects of the present disclosure generally relate to wireless communication and to techniques and apparatuses for configuration of a control resource set and common search space for initial access by low tier user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a master information block that identifies a first control resource set (CORESET) for a first category of UEs and a first common search space (CSS) associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and monitoring for a physical downlink control channel (PDCCH) candidate included in the first CORESET and the first CSS.

In some aspects, a method of wireless communication, performed by a base station, may include configuring a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and transmitting a master information block that identifies the first CORESET and the first CSS.

In some aspects, a UE for wireless communication may include memory and one or more processors operatively coupled to the memory. The memory and the one or more processors may be configured to receive a master information block that identifies a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and monitor for a physical downlink control channel (PDCCH) candidate included in the first CORESET and the first CSS.

In some aspects, a base station for wireless communication may include memory and one or more processors operatively coupled to the memory. The memory and the one or more processors may be configured to configure a first CORESET for a first category of UEs and a first CSS associated with the first CORESET, wherein the first CORE- SET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and transmit a master information block that identifies the first CORESET and the first CSS.

In some aspects, a non-transitory computer-readable medium may store one or more instructions for wireless communication. The one or more instructions, when executed by one or more processors of a UE may cause the one or more processors to: receive a master information block that identifies a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and monitor for a PDCCH candidate included in the first CORESET and the first CSS.

In some aspects, a non-transitory computer-readable medium may store one or more instructions for wireless communication. The one or more instructions, when executed by one or more processors of a base station, may cause the one or more processors to: configure a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and transmit a master information block that identifies the first CORESET and the first CSS.

In some aspects, an apparatus for wireless communication may include means for receiving a master information block that identifies a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and means for monitoring for a PDCCH candidate included in the first CORESET and the first CSS.

In some aspects, an apparatus for wireless communication may include means for configuring a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; and means for transmitting a master information block that identifies the first CORESET and the first CSS.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A, 3B, 3C, and 3D are diagrams illustrating examples of 5G/NR transmission time intervals, in accordance with various aspects of the present disclosure.

FIG. 5A is a diagram illustrating an example of SSB transmission with a 15 kilohertz (kHz) sub-carrier spacing (SCS), in accordance with various aspects of the present disclosure.

FIG. 5B is a diagram illustrating another example of SSB transmission with a 30 kHz SCS, in accordance with various aspects of the present disclosure.

FIG. 6A is a diagram illustrating an example of SSB transmission with a 120 kHz SCS, in accordance with various aspects of the present disclosure.

FIG. 6B is a diagram illustrating another example of SSB transmission with a 240 kHz SCS, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
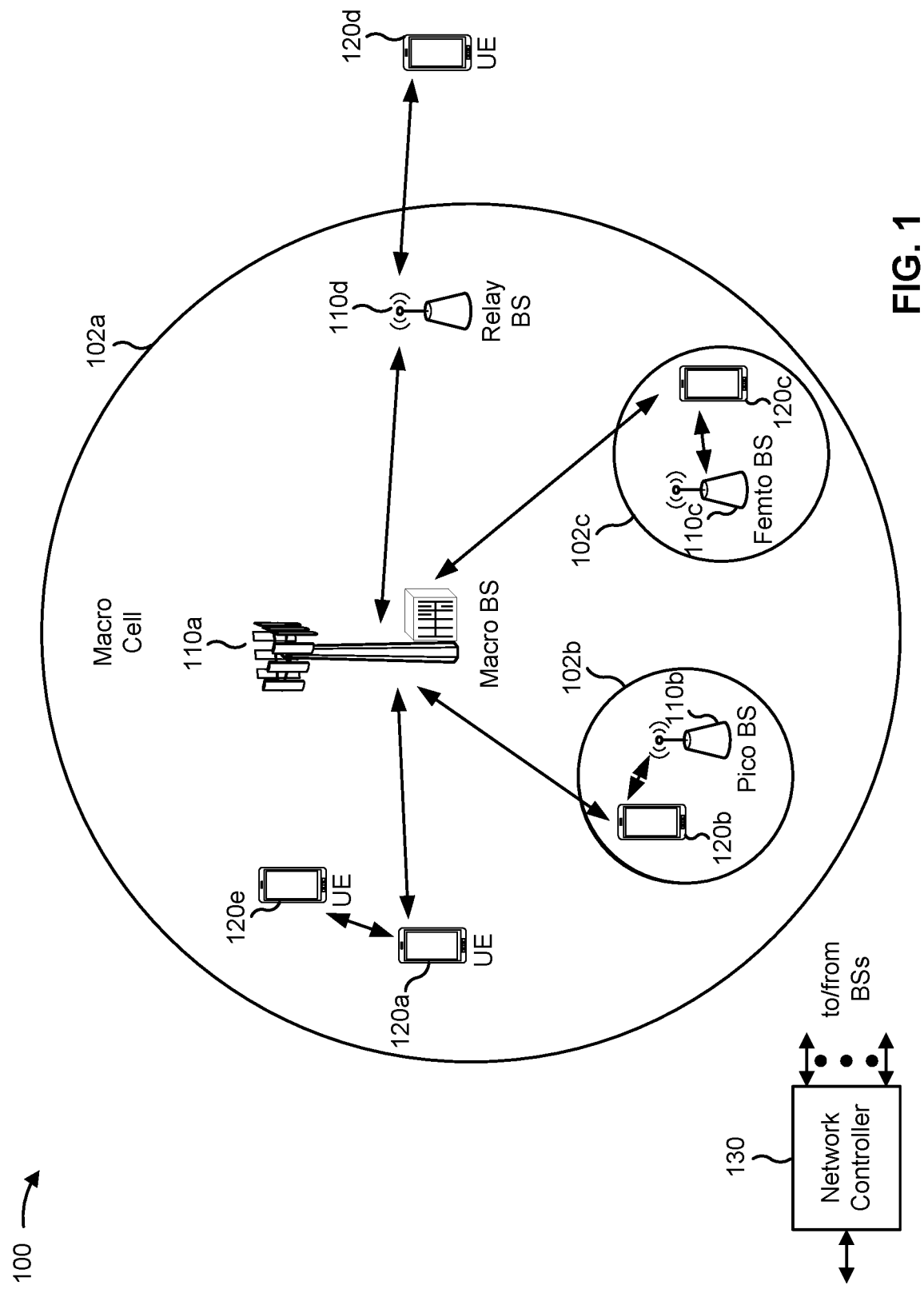
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
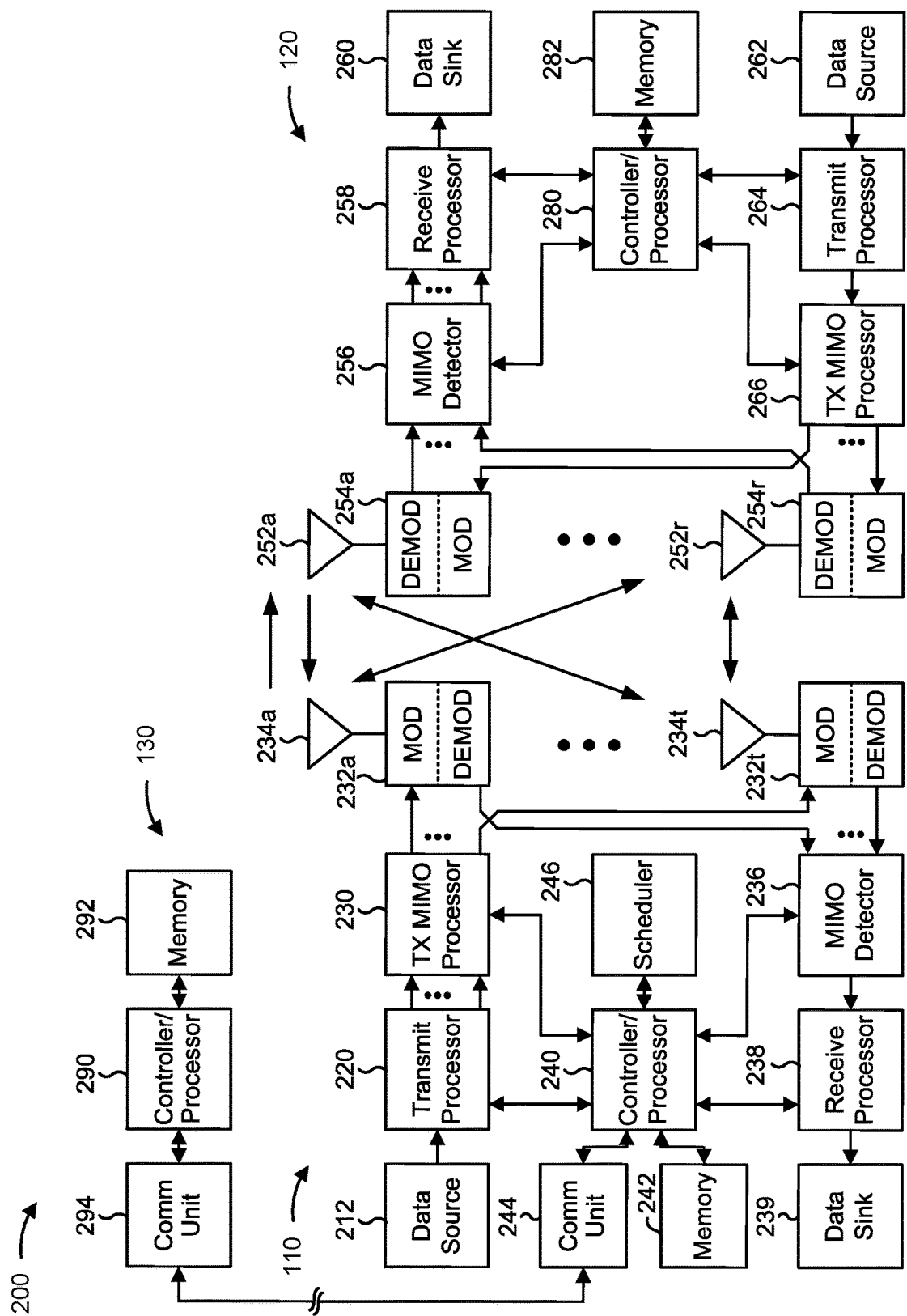
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be, respectively, one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuration of a control resource set (CORESET) and common search space (CSS) for initial access by low tier user equipment, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, process 1300 of FIG. 13, and/or other processes as described herein. A scheduler 246 may schedule UEs for data transmission on the downlink and/or uplink.

In some aspects, UE 120 may include means for receiving a master information block that identifies a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; means for monitoring for a physical downlink control channel (PDCCH) candidate included in the first CORESET and the first CSS; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS; means for transmitting a master information block that identifies the first CORESET and the first CSS; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIGS. 3A-3D are diagrams illustrating examples of 5G/NR transmission time intervals (TTIs) (e.g., frames, subframes, slots, mini-slots, and/or the like), in accordance with various aspects of the present disclosure. FIG. 3A is a diagram illustrating an example 300 of a first slot within a 5G/NR frame structure, FIG. 3B is a diagram illustrating an example 330 of downlink (DL) channels within a 5G/NR slot, FIG. 3C is a diagram illustrating an example 350 of a second slot within a 5G/NR frame structure, and FIG. 3D is a diagram illustrating an example 380 of uplink (UL) channels within a 5G/NR slot.

In some aspects, the 5G/NR TTI structure may be a frequency division duplex (FDD) structure in which, for a set of subcarriers (e.g., a carrier system bandwidth), slots within the set of subcarriers are dedicated for either DL or UL. In some aspects, the 5G/NR TTI structure may be a time division duplex (TDD) structure) in which, for a set of subcarriers (e.g., a carrier system bandwidth), slots within the set of subcarriers are dedicated for both DL and UL.

In FIG. 3A, the TTI structure is TDD with slot 4 being configured as a DL-centric slot (shown as D, where D is DL, U is UL, and X is flexible for use as DL or UL). In FIG. 3C, the TTI structure is TDD with slot 3 being configured as an UL-centric slot. While slots 3 and 4 are shown with particular slot formats, any particular slot may be configured with any of the various available slot formats 0-61. UEs are configured with the slot format dynamically via DL control information (DCI) or semi-statically via radio resource control (RRC) signaling using a slot format indicator (SFI). While a TDD structure is shown, some aspects described herein also apply to an FDD TTI structure.

As shown, a frame (e.g., of 10 ms) may be divided into 10 equally sized subframes (e.g., of 1 ms). Each subframe may include one or more slots. Subframes may also include mini-slots, which may include 7, 4, or 2 symbols. Each slot may include 7 or 14 symbols, depending on the slot configuration. The number of slots within a subframe is based on the slot configuration and a numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and $2^\mu$ slots per subframe. The subcarrier spacing and symbol duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol duration is inversely related to the subcarrier spacing. FIGS. 3A-3D provide an example of slot configuration 0 with 14 symbols per slot and numerology $\mu=0$ with 1 slot per subframe. The subcarrier spacing is 15 kHz and symbol duration is approximately 66.7 microseconds.

A resource grid may be used to represent the frame structure. Each time slot includes a resource block (RB) (also referred to as physical RBs (PRBs)) that includes 12 consecutive subcarriers. The resource grid is divided into multiple resource elements (REs). The number of bits carried by each RE depends on a modulation scheme.

As shown in FIG. 3A, some of the REs carry reference (pilot) signals (RS) for the UE 120. The RS may include demodulation RS (DMRS) (indicated as $R_x$ for one particular configuration, where 100x is the port number, but other DMRS configurations are possible) and/or channel state information reference signals (CSI-RS) for channel estimation at the UE 120. The RS may also include beam measurement RS (BRS or BMRS), beam refinement RS (BRRS), phase tracking RS (PTRS), and/or the like.

FIG. 3B illustrates an example of various DL channels within a slot. The physical downlink control channel (PDCCH) carries DCI within one or more control channel elements (CCEs). A CCE may include nine RE groups (REGs). Each REG may include four consecutive REs in an OFDM symbol. A primary synchronization signal (PSS) may be within symbol 2 of one or more slots in a frame. The PSS is used by a UE 120 to determine subframe and/or symbol timing and a physical layer identity. A secondary synchronization signal (SSS) may be within symbol 4 of one or more slots in a frame. The SSS is used by a UE 120 to determine a physical layer cell identity group number and radio frame timing. Based on the physical layer identity and the physical layer cell identity group number, the UE 120 can determine a physical cell identifier (PCI). Based on the PCI, the UE 120 can determine the locations of the aforementioned DMRS. The physical broadcast channel (PBCH), which carries a master information block (MIB), may be logically grouped with the PSS and SSS to form a synchronization signal (SS)/PBCH block. The MIB indicates a number of RBs in the system bandwidth and a system frame number (SFN). The physical downlink shared channel (PDSCH) carries user data, paging messages, and/or broadcast system information not transmitted through the PBCH, such as system information blocks (SIBs).

As illustrated in FIG. 3C, some of the REs carry DMRS (indicated as R for one particular configuration, but other DMRS configurations are possible) for channel estimation at the base station 110. The UE 120 may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE 120 may transmit sounding reference signals (SRSs). The SRSs may be used by a base station 110 for channel quality estimation to enable frequency-dependent scheduling on the UL.

FIG. 3D shows an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and/or HARQ ACK/NACK feedback. The PUSCH carries data, and may additionally be used to carry a buffer status report (BSR), a power headroom report (PHR), and/or UCI.

As indicated above, FIGS. 3A-3D are provided as examples. Other examples may differ from what is described with regard to FIGS. 3A-3D.

Figure 4:
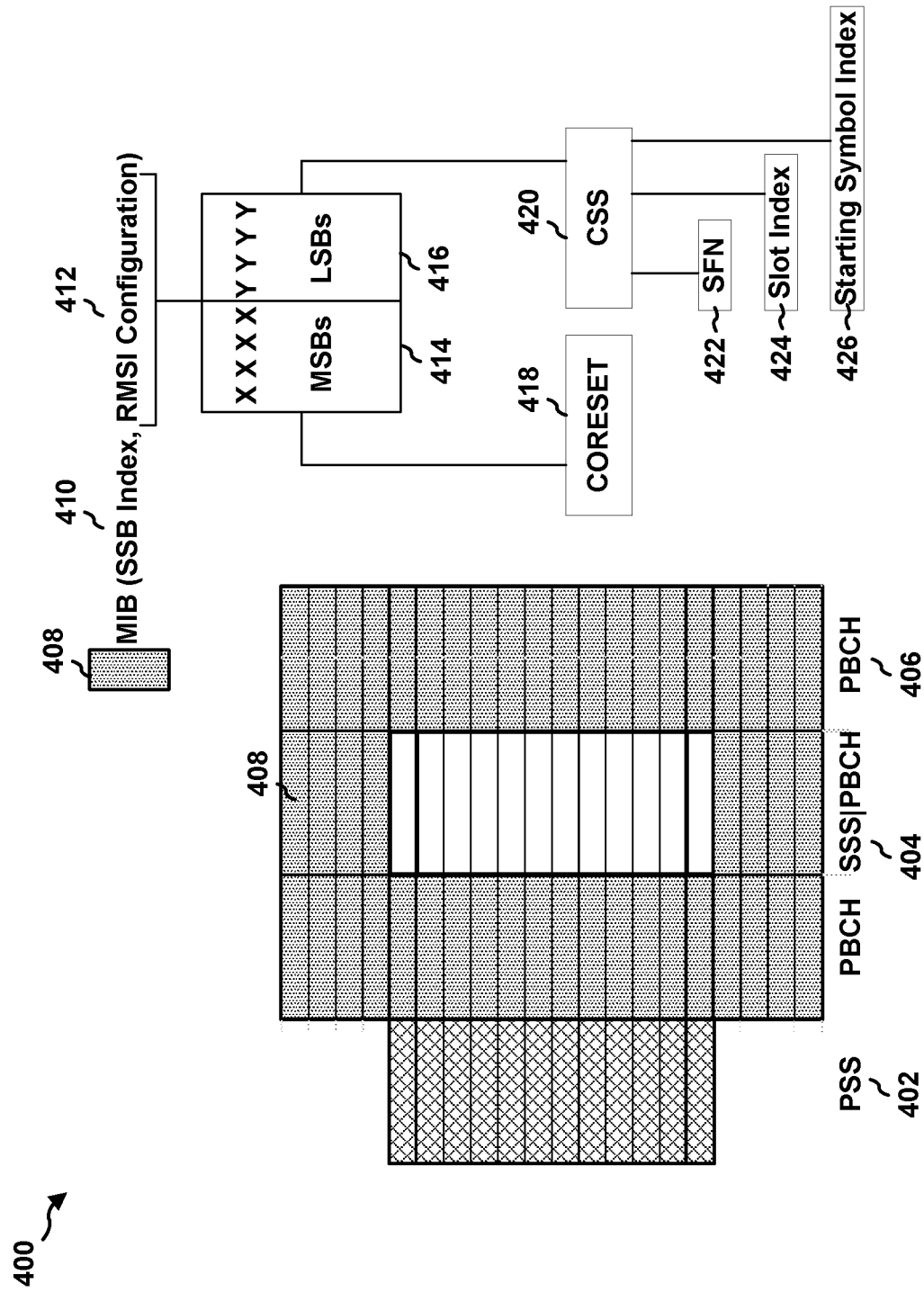
FIG. 4 is a diagram illustrating an example of a synchronization signal block (SSB), in accordance with various aspects of the present disclosure.

FIG. 4 is a diagram illustrating an example of a synchronization signal block (SSB), in accordance with various aspects of the present disclosure.

Certain UEs (for example, NR-Light UEs or low tier UEs) may be a lower tier than, or have reduced capabilities in comparison to, other UEs (e.g., legacy UEs, high tier UEs). As an example, a low tier UE may have reduced transmission power (e.g., a lower maximum transmission power) than a high tier UE. For instance, a low tier UE may have a typical uplink transmission power of at least 10 dB less than that of legacy enhanced mobile broadband (eMBB) UE. As another example, low tier UEs may have reduced transmission bandwidth or reception bandwidth than other UEs. For instance, a low tier UE may have an operating bandwidth between 5 MHz and 10 MHz for both transmission and reception, in contrast to a high tier UE which may have 20-100 MHz bandwidth. As a further example, a low tier UE may have a reduced number of reception antennas in comparison to other UEs. For instance, a low tier UE may have only a single receive antenna and thus a lower equivalent receive signal to noise ratio (SNR) in contrast to other UEs which may regularly have, for example, four antennas. Low tier UEs may also have reduced computational complexity relative to other UEs. Examples of low tier UEs may include, but are not limited to, smart wearable devices, industrial sensors, and video surveillance devices.

Low tier UEs and legacy UEs may receive synchronization signal blocks (SSBs). FIG. 4 illustrates a conceptual diagram of an SSB. The SSB includes a primary synchronization signal (PSS) 402 and a secondary synchronization signal (SSS) 404. The PSS 402 and the SSS 404 may be used for radio frame synchronization and may each span one symbol of the SSB. The SSB may include a physical broadcast channel (PBCH) 406 that carries a master information block (MIB) 408 and spans at least two symbols of the SSB. The PSS, SSS, and PBCH are time-domain multiplexed (TDM) in consecutive symbols, and the SSB can be used in single and multi-beam scenarios. Moreover, the PSS and SSS in an SSB may have different subcarrier spacing (SCS) depending on the base station's operating frequency range. For example, if the operating frequency is below 6 GHz (e.g., sub-6 GHz), the SCS may be 15 kHz or 30 kHz. However, if the base station's operating frequency is above 6 GHz (e.g., millimeter wave (mmW)), the SCS may be 120 kHz or 240 kHz.

A base station 110 may transmit multiple SSBs within an SS burst set. Each of the SSBs may contain their own PBCH and MIB, and each SSB may correspond to a different transmission beam from the base station 110 during a beam sweep. While an SS burst set may have a particular periodicity (e.g., 20 ms), SSBs are generally confined within a 5 ms window in that period. The maximum number of possible candidate locations for SSBs in a 5 ms window may be defined as L, which may change depending on the base station's operating or carrier frequency range. As examples, L=4 for a carrier frequency range up to 3 GHz, L=8 for carrier frequency range from 3 GHz to 6 GHz, and L=64 for a carrier frequency range from 6 GHz to 52.6 GHz. Additional details are provided below in connection with FIGS. 5A, 5B, 6A, and 6B.

As shown in FIG. 4, the PBCH 406 includes MIB 408. As illustrated in Table 1, reproduced below, the MIB may include multiple parameters altogether resulting in identical PBCH payload sizes for sub-6 and above-6 GHz frequency ranges. The parameters may include at least a system frame number (SFN), a half-frame indicator, an SSB index 410, a raster offset, a default downlink (DL) numerology, a remaining system information (RMSI) configuration 412, a front loaded demodulation reference signal (DMRS), cell barring, cell reselection, reserved bits, and a cyclic redundancy check (CRC).

TABLE 1

| PBCH payload | sub-6 (Bits) | mmW (Bits) | Notes |
|---|---|---|---|
| SFN | 10 | 10 | Entire SFN |
| Half-frame indicator | 1 | 1 | Always conveyed explicitly. For frequencies under 3 GHz, additionally in DMRS scrambling. |
| SSB index | 0 | 3 | 3 additional bits conveyed in DMRS scrambling. |

TABLE 1-continued

| PBCH payload | sub-6 (Bits) | mmW (Bits) | Notes |
|---|---|---|---|
| Raster offset | 5 | 4 | Sync/PRB raster offset indication including possibility for different numerology. |
| Default DL numerology | 1 | 1 | 15 or 30 kHz for sub6. 60 or 120 kHz for above-6. |
| RMSI config | 8 | 8 | All RMSI CORESETs associated with SSBs within an SSB burst set have the same settings (including time duration) except time-domain location. |
| Front loaded DMRS | 1 | 1 | $2^{nd}$ or $3^{rd}$ OFDM symbol in the slot. |
| Cell barring | 1 | 1 | |
| Cell reselection | 1 | 1 | |
| Reserved | 4 | 2 | |
| CRC | 24 | 24 | Same as DCI |
| Total: | 56 | 56 | |

Two of these MIB parameters, in particular, include the SSB index 410 and the remaining system information (RMSI) configuration 412. Each SSB 400 within a SSB burst set has its own SSB index within the MIB. For sub-6 GHz frequency ranges, a UE may identify an SSB index 410 from the DMRS scrambling sequence in PBCH 406. However, in above-6 GHz or mmW frequencies, the MIB payload includes three additional bits for the UE to identify the SSB index 410 (giving altogether 64 possibilities of SSB indices). The 3 most significant bits (MSBs) of the SSB index (or 3 reserved bits in above-6 frequencies), the 1 bit half radio frame index, and the 4 least significant bits (LSBs) of the SFN in the PBCH payload may be implemented as physical layer generated signals. The rest of the PBCH payload may be provided by an upper layer with, for example, an 80 ms transmission time interval (TTI). The PBCH contents, except the SSB index 410, are the same for all SSBs within an SSB burst set for a same center frequency.

RMSI configuration 412 is another parameter in MIB. This parameter may be composed of a number of bits including one or more MSBs 414 and one or more LSBs 416. For example, as illustrated in FIG. 4, the RMSI configuration 412 may include 8 bits in total, with four MSBs 414 and four LSBs 416. In other examples, the RMSI configuration 412 may include other numbers of bits, MSBs 414 and/or LSBs 416. For example, RMSI configuration 412 may include 5 MSBs and 3 LSBs, or vice-versa.

The one or more MSBs 414 of RMSI configuration 412 may identify a CORESET 418 carrying a PDCCH, and the one or more LSBs 416 may identify a Type-0 PDCCH CSS 420 for the CORESET 418 carrying the PDCCH. This CORESET 418 may be referred to as CORESET-0. The CORESET 418 is a set of resource grids including a number of consecutive RBs and a number of OFDM symbols. The CSS 420 is associated with the identified SSB index 410, and specifies an SFN 422, a slot-index 424, and a starting-symbol-index 426 to search for the identified CORESET 418.

During initial access to the base station, the UE first attempts to decode a received PBCH 406 and identify the payload of the MIB 408. Based on the DMRS sequence and/or MIB, the UE identifies the SSB index 410 associated with the decoded PBCH 406. Furthermore, based on the RMSI configuration 412 in the MIB 408, the UE identifies the CORESET 418 (i.e., CORESET-0) and the related CSS 420 corresponding to the SSB index 410. A number of aggregation levels (ALs) (for example, three) may be defined in association with the CORESET 418 which identifies a number of control channel elements (CCEs) in which the UE may locate one or more PDCCH candidates. Based on the identified CORESET-0 and ALs, the UE attempts to blind decode the PDCCH candidates to identify DCI in the PDCCH. The UE may then decode the DCI, which schedules at least one physical downlink shared channel (PDSCH) carrying the payload of RMSI. Upon receiving the RMSI, the UE may proceed to complete the initial access procedure.

The CORESET 418 may include many parameters, including a number of OFDM symbols and a number of RBs, a resource element group (REG) which corresponds to one physical resource block (PRB) in one OFDM symbol (i.e. 12 subcarriers), a CCE which corresponds to 6 REGs, a CCE AL which corresponds to the number of CCEs that constitute a PDCCH candidate, a REG bundle size (e.g., including contiguous REGs in the frequency and/or time domains), and an interleaving pattern for the REG bundles (i.e., in the frequency domain). With respect to CORESET-0, which is received when the UE is attempting to initially search for a PDCCH to access the base station, the number of OFDM symbols and the number of RBs are based on the one or more MSBs in RMSI configuration 412, the CCE AL candidates may be 4 (e.g., 4 PDCCH candidates), 8 (e.g., 2 PDCCH candidates), or 16 (e.g., 1 PDCCH candidate), the REG bundle size may be fixed to 6 REGs, and the interleaving pattern may be fixed (e.g., R=2). A low tier UE with lower SNR or fewer reception antennas than legacy UEs may benefit from PDCCH candidates with higher AL, as those PDCCH candidates may have a lower coding rate.

Due to the interleaving pattern, the CCEs for the PDCCH candidates generally span the entire bandwidth of resources in CORESET-0. The UE must therefore be able to receive the entire CORESET to decode all the PDCCH candidates. However, a problem may arise where a low tier UE may not be able to receive the CORESET-0. Depending on the CORESET-0's SCS and number of RBs, the CORESET-0 may have a bandwidth exceeding the low tier UE's reception bandwidth. Table 2 illustrates different example combinations of SCS and RBs which may be possible for a CORESET-0 (where the bandwidth of the CORESET depends on the number of RBs).

TABLE 2

| Subcarrier spacing (kHz) | # of RBs | Bandwidth (MHz) |
|---|---|---|
| 15 | 24, 48, 96 | 4.32, 8.64, 17.28 |
| 30 | 24, 48, 96 | 8.64, 17.28, 34.56 |
| 60 | 24, 48, 96 | 17.28, 34.56, 69.12 |
| 120 | 24, 48, 96 | 34.56, 69.12, 138.24 |

Thus, depending on the SCS and number of RBs configured for CORESET-0, the low tier UE may not be able to decode PDCCH, since the low tier UE's reception bandwidth may be lower than that of CORESET-0 in certain cases. For example, if the low tier UE has a reception bandwidth of only 5 MHz, the low tier UE may not be able to receive the entire CORESET-0 if the SCS is 15 kHz and the number of RBs is 48 or 96, since the CORESET bandwidth (8.64 MHz or 17.28 MHz) would be larger than the 5 MHz bandwidth of the UE.

A low tier UE may not be able to resolve this problem by attempting to decode MIB in PBCH through multiple rounds of reception of CORESET-0. For example, such UEs may not be able to simply receive part of the PDCCH associated with one SSB index and receive another part of the PDCCH associated with another SSB index. The reason is the PDCCH candidate within a CORESET-0 received in one SSB instance may not necessarily be the same as that received in another SSB instance. For example, the base station may attempt to dynamically change the location of the PDCCH resource between SSBs to provide flexibility of resource scheduling. Moreover, as described above with respect to CORESET-0 parameters, CCEs are generally interleaved across the whole frequency resource of CORESET-0 according to a fixed interleaving pattern. Therefore, if a low tier UE only receives a single part of the CORESET-0 in a single instance, the UE may not be able to receive all the CCEs needed to decode a PDCCH candidate.

As indicated above, FIG. 4 is provided as an example. Other examples may differ from what is described with regard to FIG. 4.

FIGS. 5A and 5B illustrate examples of different SSB locations and maximum values L for different SCS in the sub-6 frequency range. In particular, FIG. 5A illustrates a conceptual diagram 500 illustrating SSB locations within a 5 ms half-frame 502 at 15 kHz SCS, while FIG. 5B illustrates a conceptual diagram 550 illustrating SSB locations within a 5 ms half-frame 552 at 30 kHz SCS. Referring to FIG. 5A, for 15 kHz SCS, each subframe 504 of half-frame 502 includes one 1 ms slot 506 of fourteen OFDM symbols 508. Symbols 2-5 show one SSB 510 corresponding to one transmission beam, and symbols 8-11 show another SSB 510 corresponding to another beam. In this example, SSBs are transmitted within four subframes 504, resulting in at most 8 SSBs (L=8) in half-frame 502. Referring to FIG. 5B, for a higher 30 kHz SCS, each subframe 554 of half-frame 552 includes two 0.5 ms slots 556 each with fourteen OFDM symbols 558. In this example, the transmission of 8 SSBs 560 (L=8) occurs every 2 ms rather than the 4 ms shown in FIG. 5A. Moreover, there may be two band-specific mapping options 562 for SSBs in 30 kHz SCS as illustrated in FIG. 5B.

As indicated above, FIGS. 5A and 5B are provided as examples. Other examples may differ from what is described with regard to FIGS. 5A and 5B.

FIGS. 6A and 6B illustrate examples of different SSB locations and maximum values L for different SCS in the above-6 GHz (mmW) frequency range. In particular, FIG. 6A illustrates a conceptual diagram 600 illustrating SSB locations within a 5 ms half-frame 602 at 120 kHz SCS, while FIG. 6B illustrates a conceptual diagram 650 illustrating SSB locations within a 5 ms half-frame 652 at 240 kHz SCS. Referring to FIG. 6A, for 120 kHz SCS, each slot 604 of half-frame 602 includes eight 0.125 ms slots 606 of fourteen OFDM symbols 608. In this example, 4 SSBs 610 are transmitted within two slots 604, resulting in at most 64 SSBs (L=64) in half-frame 602 (corresponding to 64 transmission beams from the base station). Referring to FIG. 6B, for a higher 240 kHz SCS, each subframe 654 of half-frame 652 includes sixteen 0.0625 ms slots 656 each with fourteen OFDM symbols 658. In this example, 8 SSBs 660 are transmitted within four slots 604, resulting in at most 64 SSBs (L=64) in half-frame 602.

As indicated above, FIGS. 6A and 6B are provided as examples. Other examples may differ from what is described with regard to FIGS. 6A and 6B.

Figure 7:
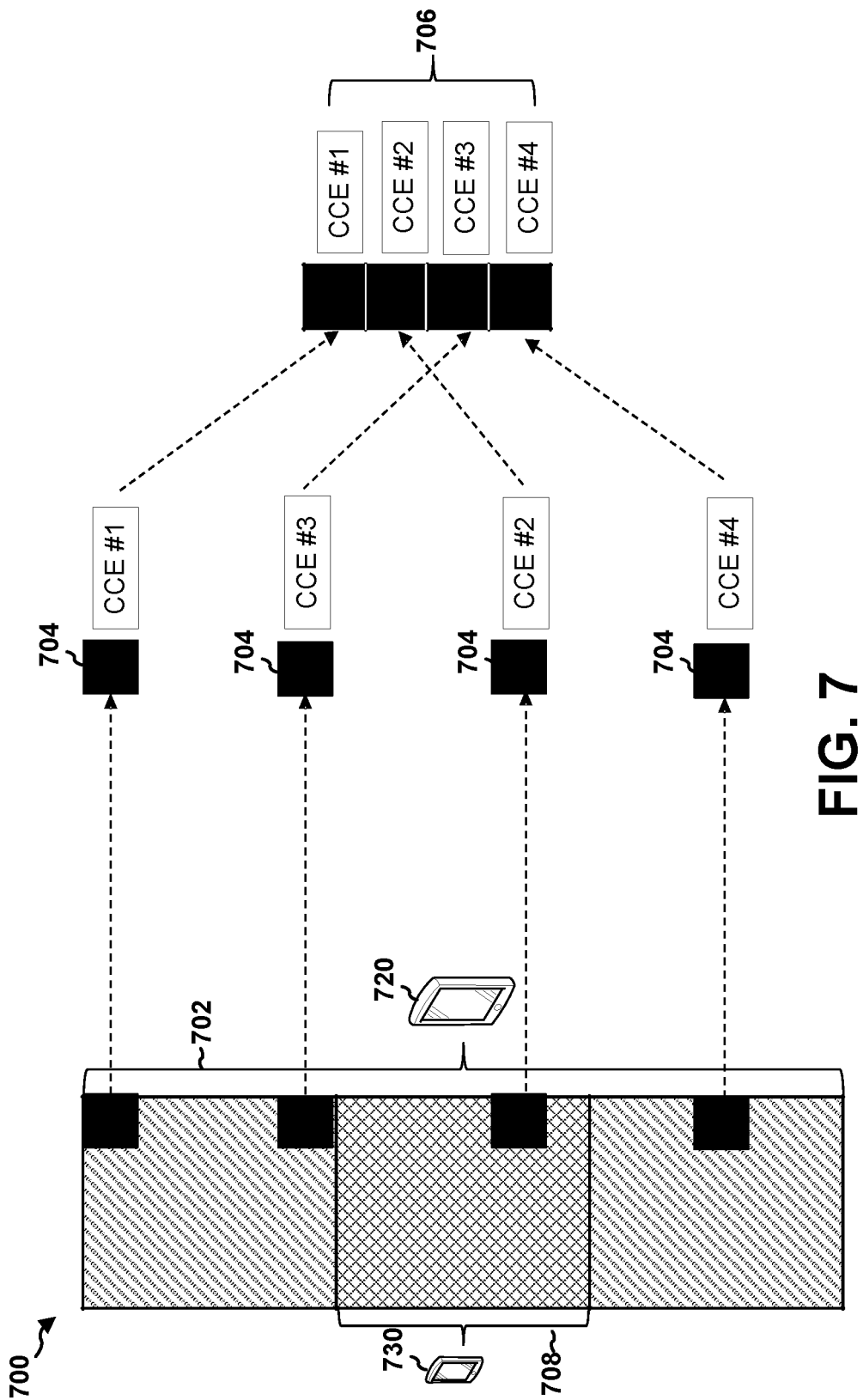
FIG. 7 is a diagram illustrating an example control resource set with control channel elements, in accordance with various aspects of the present disclosure.

FIG. 7 is a diagram illustrating an example control resource set with control channel elements, in accordance with various aspects of the present disclosure.

As shown in FIG. 7, a CORESET-0 702 may include an interleaving pattern of CCEs 704. As further shown in FIG. 7, the CCEs 704 for a certain PDCCH candidate 706 may be located across all of the frequencies of CORESET-0 702 in an interleaved pattern (e.g., CCE #1, 3, 2, 4). Due to the interleaving of CCEs 704 in the CORESET-0 702, a UE 720 generally must find the CCEs 704 spanning the entire bandwidth of the CORESET-0 702, reorder them into a correct order as illustrated (e.g., CCE #1, 2, 3, 4), and decode the CCEs to identify the PDCCH. However, because a low tier UE 730 may only be able to receive a portion of the CORESET-0 corresponding to its reception bandwidth 708, the low tier UE 730 may be incapable of receiving all of the CCEs of the CORESET that are required to decode the PDCCH (e.g., FIG. 7 illustrates that low tier UE 730 would only be able to receive CCE #2 in this example). Thus, a low tier UE would be incapable of decoding a PDCCH due to its reduced reception bandwidth. Moreover, simply implementing a new CCE mapping pattern for a PDCCH candidate within that reduced bandwidth 708 (e.g., placing CCEs #1-4 within reception bandwidth 708) would require additional signaling to legacy UEs 720 informing them of this new pattern so they can decode their own PDCCH candidates. Thus, there is a need to provide a low bandwidth (low-BW) CORESET-0 and associated CSS for low tier UEs which does not exceed the reception bandwidth of the low tier UE, and which can be interpreted from system configuration information (for example, RMSI configuration) without requiring additional signaling to legacy UEs, in order to enable coexistence between low tier UEs and legacy UEs so that legacy UEs may continue to receive their own CORESET-0 (e.g., legacy CORESET-0).

In some aspects, system configuration information (for example, RMSI configuration) in the MIB may be reused to enable low tier UEs to identify a low-BW CORESET-0 and its associated search space based on a different interpretation of the system configuration information than by legacy UEs, without requiring additional signaling for legacy UEs. A base station may configure a different structure for low-BW CORESET-0 than for legacy CORESET-0 including multiple resource grids (RGs) and CSS associated with the RGs, which the low tier UE can identify from the system configuration information. To improve resource utilization of the low-BW CORESET-0, the low-BW CORESET-0 may be configured to include one or more overlapping RGs with the legacy CORESET-0 which is also identified by the same system configuration information by legacy UEs. In order to provide higher AL to reduce coding rate, additional, non-overlapping RGs with legacy CORESET-0 may be time-division-multiplexed (TDM) with the one or more overlapping RGs. Low tier UEs may be able to receive the overlapping and non-overlapping RGs and decode PDCCH candidates from a resource grid group comprised of those RGs. To prevent non-overlapping RGs from conflicting with resources which are used by other CSSs or SSBs, the RGs associated with the low-BW CORESET-0 may be continuous (or contiguous) or non-continuous (or non-contiguous) in the time domain or frequency domains.

As indicated above, FIG. 7 is provided as an example. Other examples may differ from what is described with regard to FIG. 7.

Figure 8:
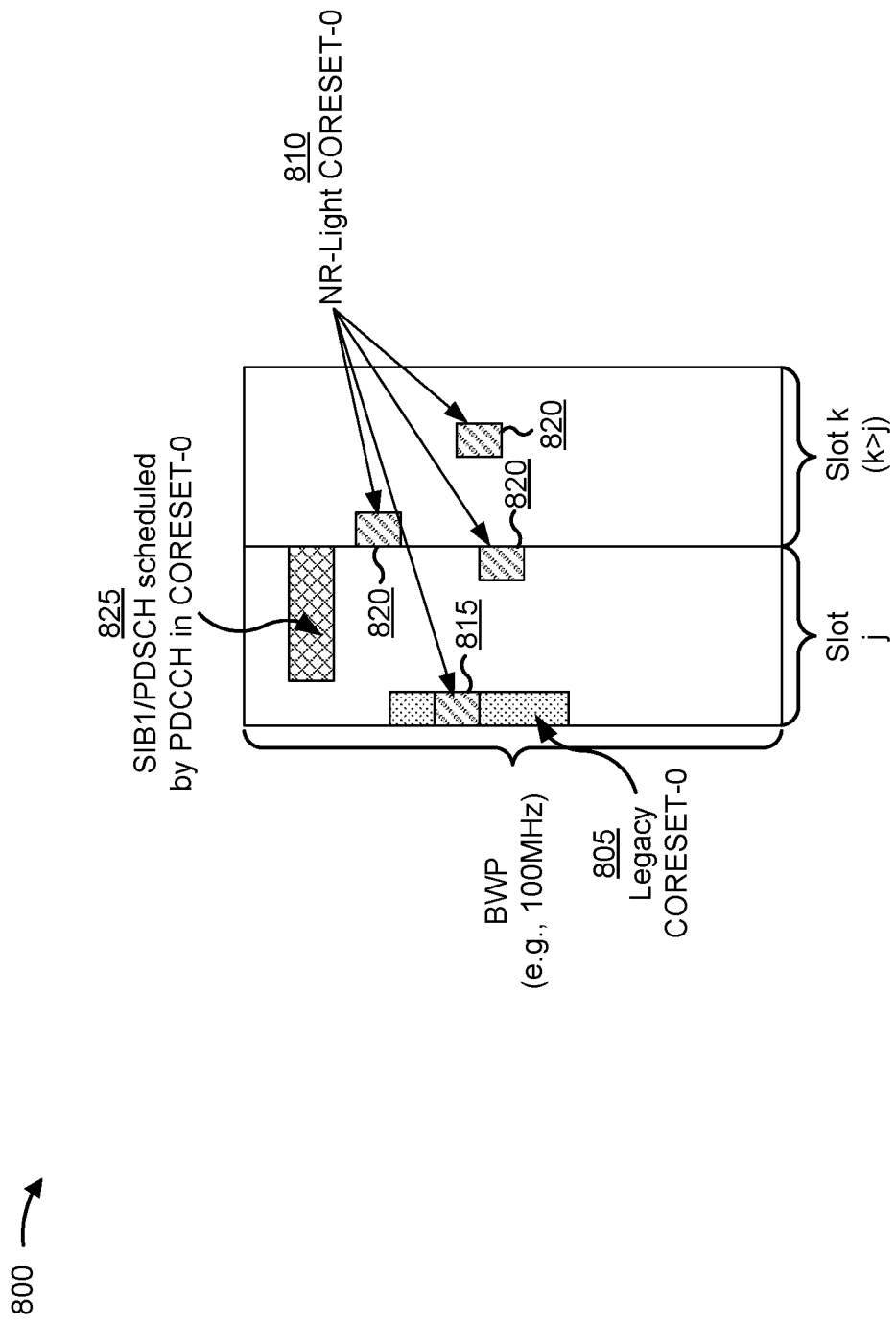
FIGS. 8-11 are diagrams illustrating examples of configuration of a control resource set and common search space for initial access by low tier user equipment, in accordance with various aspects of the present disclosure.

FIG. 8 is a diagram illustrating an example 800 of configuration of a CORESET and CSS for initial access by low tier UEs, in accordance with various aspects of the present disclosure.

As shown by reference number 805, a legacy CORESET-0 (e.g., for high tier UEs) and a corresponding legacy CSS may span a bandwidth that is wider than a capability of a low tier UE. In this case, as shown by reference number 810, an NR-Light CORESET-0 (e.g., for low tier UEs) and a corresponding NR-Light CSS may be configured for use by low tier UEs. As shown, the NR-Light CORESET-0 and CSS may identify one or more overlapping resource grids 815 that overlap in time and frequency with one or more corresponding resource grids of the legacy CORESET-0 and the legacy CSS. Additionally, or alternatively, the NR-Light CORESET-0 and CSS may identify one or more non-overlapping resource grids 820 that do not overlap in time and frequency with the legacy CORESET-0 and the legacy CSS (e.g., that are time-division multiplexed with the legacy CORESET-0 and the legacy CSS).

As shown, the non-overlapping resource grids 820 may include time domain resources that occur later in time than the legacy CORESET-0 and the legacy CSS. For example, the legacy CORESET-0 and legacy CSS is shown as occupying one or more time domain resources at the beginning of a slot (e.g., slot j), and the non-overlapping resource grids 820 are shown as occupying time domain resources at the end of the slot and also in a subsequent slot (e.g., slot k, where k>j). This configuration may lead to poor performance of a low tier UE.

For example, as shown by reference number 825, a PDSCH communication (e.g., that includes SIB1) scheduled by the PDCCH in CORESET-0 may occur in the same slot (e.g., slot j) as the legacy CORESET-0 and legacy CSS. This scheduling works well for high tier UEs that are able to obtain and decode the PDCCH and the PDSCH in the same slot due to a wide operating bandwidth. However, a low tier UE may not be able to obtain and decode the PDCCH until a later time (e.g., toward the end of slot j) and/or a later slot (e.g., slot k) due to the placement of the non-overlapping resource grids 820 that occur during or after transmission of the PDSCH. In this case, the low tier UE may need to buffer communications received in slot j until the low tier UE receives and decodes the PDCCH (e.g., in slot k). However, because of reduced capabilities and/or less powerful hardware (e.g., smaller buffer size, less processing power, and/or the like), the low tier UE may not be capable of buffering all communications in slot j, particularly when the PDSCH occurs in different frequency resources than an overlapping resource grid 815. Some techniques and apparatuses described herein permit a low tier UE to obtain a PDSCH communication (e.g., including SIB1) that is scheduled in the same slot as a legacy CORESET-0 and legacy CSS that includes a PDCCH candidate that schedules the PDSCH communication.

As indicated above, FIG. 8 is provided as an example. Other examples may differ from what is described with regard to FIG. 8.

Figure 9:
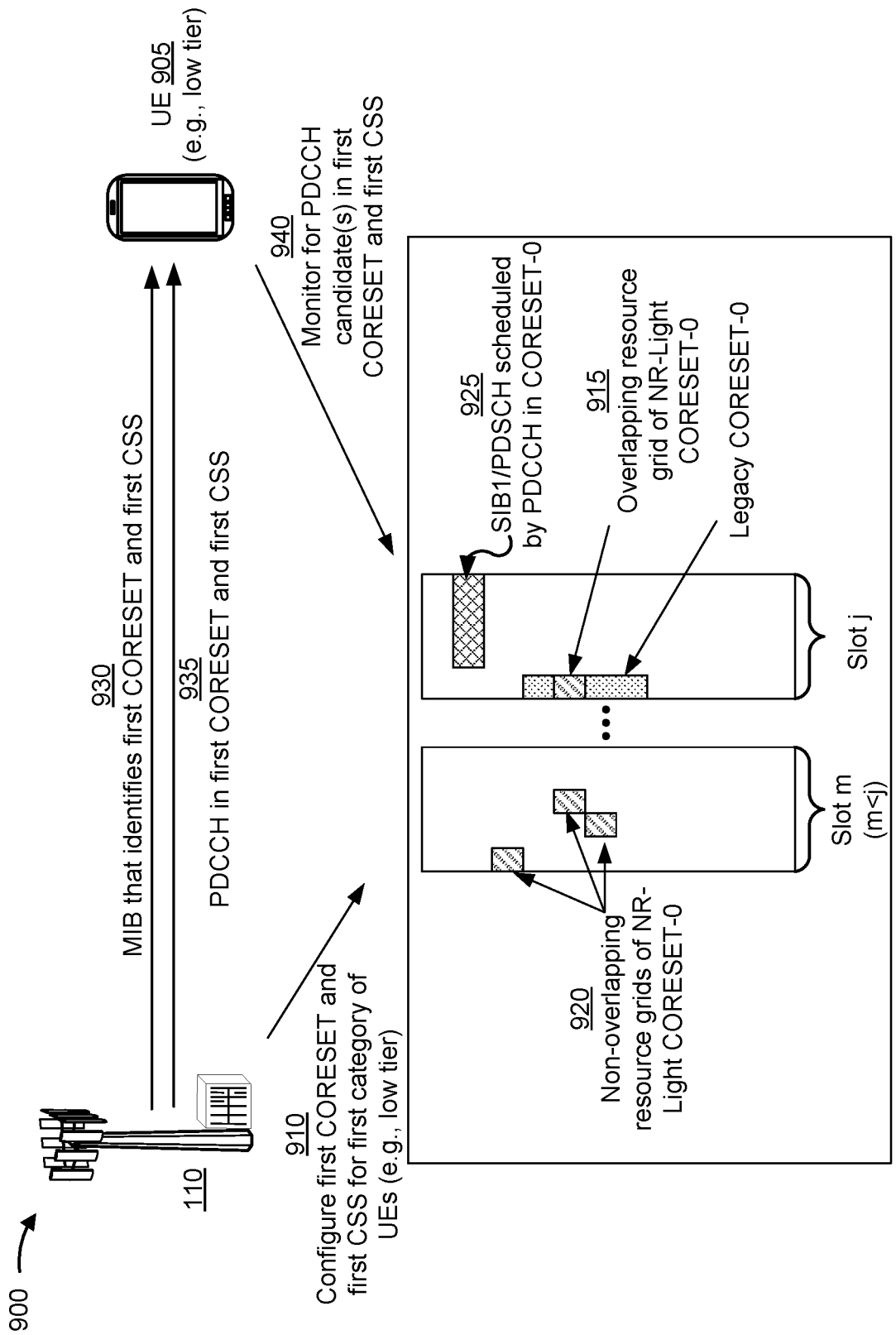

FIG. 9 is a diagram illustrating another example 900 of configuration of a CORESET and CSS for initial access by low tier UEs, in accordance with various aspects of the present disclosure.

As shown in FIG. 9, a base station 110 and a UE 905 may communicate with one another. The UE 905 may be included in a first category of UEs, such as low tier UEs. In 5G, different categories of UEs may operate with different capabilities. For example, a first category of UE (e.g., an NR-Light UE, an NR-Lite UE, a low tier UE, a moderate tier UE, a reduced feature set UE, and/or the like) may have a lower capability and/or a reduced feature set compared to a second category of UE. Likewise, the second category of UE (e.g., an NR UE, a premium UE, a high tier UE, an advanced feature set UE, and/or the like) may have a higher capability and/or an advanced feature set compared to the first category of UE. For example, UEs of the first category may be capable of communicating on a narrower maximum bandwidth part than UEs of the second category (e.g., may not be capable of communicating using as wide of a bandwidth as UEs of the second category), may support a lower maximum modulation and coding scheme (MCS) than UEs of the second category (e.g., quadrature phase shift keying (QPSK) or the like as compared to 256-quadrature amplitude modulation (QAM) or the like), may support a lower transmit power than UEs of the second category (e.g., a lower maximum transmit power), may have a less advanced beamforming capability than UEs of the second category, may not be capable of communicating using a shortened transmission time interval (TTI) (e.g., a slot length of 1 ms or less, 0.5 ms, 0.25 ms, 0.125 ms, 0.0625 ms, and/or the like, depending on a sub-carrier spacing) with which UEs of the second category are capable of communicating, may have a smaller buffer size than UEs of the second category, and/or the like.

As shown by reference number 910, the base station 110 may configure a first CORESET (shown as an NR-Light CORESET-0) for a first category of UEs (e.g., low tier UEs) and may configure a first CSS associated with the first CORESET. The first CORESET and first CSS may be used by the first category of UEs for initial network access prior to obtaining SIB1. For example, the first CORESET and first CSS may be indicated in a MIB of a PBCH (e.g., in an SS/PBCH block). The first CORESET may be referred to as CORESET-0, and may carry Type-0 PDCCH used to schedule at least one PDSCH that carries SIB1. A CORESET may specify a set of resource grids (e.g., a number of consecutive RBs or subcarriers, and a number of OFDM symbols). A CSS may specify a set of time domain resources in which the CORESET is located (e.g., a system frame number (SFN, a slot index, a starting symbol index, and/or the like). Using a CORESET and a CSS, a UE 120 can identify a set of resources to be blind decoded for PDCCH candidates. In some aspects, each resource grid, in the set of resource grids included in a CORESET, includes one or more REGs of at least one CCE of the CORESET.

As shown by reference number 915, the first CORESET and the first CSS may identify one or more overlapping resource grids that overlap in time and frequency with one or more corresponding resource grids of a second CORESET (shown as a legacy CORESET-0) and a second CSS, associated with the second CORESET, for the second category of UEs (e.g., high tier UEs). By configuring at least one resource grid of the NR-Light CORESET-0 to overlap with the legacy CORESET-0, the base station 110 may conserve network resources by reusing some network resources for both the NR-Light CORESET-0 and the legacy CORESET-0.

As shown by reference number 920, the first CORESET and the first CSS may identify one or more non-overlapping resource grids that include a corresponding one or more time domain resources that are earlier than a time domain resource of the second CORESET and the second CSS. For example, the non-overlapping resource grids (e.g., the time domain resources of the non-overlapping resource grids) are shown as occurring in a first slot, shown as slot m, and the legacy CORESET-0 is shown as occurring in a second slot, shown as slot j. The first slot m may be a number of slots before the second slot j (e.g., the first slot m occurs before the second slot j, so that m<j). As described in more detail below in connection with FIGS. 10 and 11, the first slot m may be the slot immediately prior to the second slot j (e.g., the number of slots may be equal to one), or the first slot m may precede the second slot j by more than one slot (e.g., the number of slots may be greater than one).

In FIG. 9, the non-overlapping resource grids (e.g., the time domain resources of the non-overlapping resource grids) are shown as occurring at the beginning of the first slot m, shown as the first three OFDM symbols of the first slot m (e.g., where the number of OFDM symbols may depend on the number of time-division multiplexed non-overlapping resource grids). In this case, the non-overlapping resource grids may occur within a threshold number of OFDM symbols after the start of (e.g., a starting boundary of) the first slot m. As described in more detail below in connection with FIGS. 10 and 11, in some aspects, the non-overlapping resource grids (e.g., the time domain resources of the non-overlapping resource grids) may occur at the end of the first slot m. In this case, the non-overlapping resource grids may occur within a threshold number of OFDM symbols before the end of (e.g., an ending boundary of) the first slot m.

As shown by reference number 925, in some cases, the base station 110 may schedule a PDSCH communication, that carries SIB1, in a same slot as the second CORESET. For example, the PDSCH with SIB1 may be scheduled by a Type-0 PDCCH carried in CORESET-0 (e.g., both the legacy CORESET-0 and the NR-Light CORESET-0). As described above in connection with FIG. 8, by configuring the non-overlapping resource grids of the NR-Light CORESET-0 to occur earlier in time than the legacy CORESET-0 (e.g., earlier in time than slot j), a low tier UE 905 may be able to obtain SIB1 without buffering the communications in slot j and/or with reduced buffering as compared to a case where the non-overlapping resource grids were configured to occur at a later time than the legacy CORESET-0.

As shown by reference number 930, the base station 110 may transmit, and the UE 905 may receive, a MIB that identifies the first CORESET and the first CSS. For example, the base station 110 may transmit the MIB in the PBCH (e.g., in an SS/PBCH block), as described elsewhere herein. The first CORESET and the first CSS may be identified in the MIB using a set of bits, such as 8 bits of a remaining minimum system information (RMSI) configuration. In some aspects, a set of most significant bits of the RMSI configuration (e.g., the first four bits) identifies the first CORESET, and a set of least significant bits of the RMSI configuration (e.g., the last four bits) identifies the first CSS. In some aspects, the same value of the RMSI configuration (e.g., the same set of 8 bits) may indicate the first CORESET and the first CSS for a first category of UEs, and may also indicate the second CORESET and the second CSS for the second category of UEs. In other words, a UE 120 may interpret the RMSI configuration based at least in part on a category of the UE 120, thereby conserving overhead by reusing the RMSI configuration to indicate different CORESETs and corresponding CSSs for different categories of UEs.

As shown by reference number 935, the base station 110 may transmit one or more PDCCH communications in the first CORESET and the first CSS. As described above, a PDCCH communication (e.g., DCI) in the first CORESET and the first CSS may include a Type-0 PDCCH that schedules a PDSCH that carries SIB1. As shown by reference number 940, the UE 905 may monitor for one or more PDCCH candidates included in the first CORESET and the first CSS. For example, the UE 905 may perform blind decoding of PDCCH candidates included in the first CORESET and the first CSS.

When the non-overlapping resource grids of the first CORESET are configured to occur prior to the second CORESET, then the UE 905 may not need to buffer communications in the entire configured bandwidth part (BWP) of the slot in which the second CORESET occurs (e.g., slot j) in order to obtain SIB1 (e.g., which may occur anywhere in the bandwidth of slot j). For example, the UE 905 can buffer the non-overlapping resource grids, which occur in a narrower bandwidth than the entire BWP. Upon receiving the overlapping resource grid, the UE 905 can decode PDCCH candidate(s) in the first CORESET to obtain SIB1 without buffering communications in the entire BWP in which the overlapping resource grid occurs. This may permit a low tier UE 905 to obtain SIB1, which the low tier UE 905 may otherwise not be able to obtain due to complexity in processing and storing communications across the entire BWP. Furthermore, this may conserve resources of the low tier UE 905 (e.g., processing resources, memory resources, battery power, and/or the like), which may have limited resources.

As described elsewhere herein, in some aspects, each resource grid (e.g., of the one or more non-overlapping resource grids and the one or more overlapping resource grids) includes one or more REGs of at least one CCE of the first CORESET. In some aspects, the base station 110 may configure resource grids that occur earlier in time to include CCEs with lower indexes as compared to indexes of CCEs included in resource grids that occur later in time. In this way, the UE 905 can begin decoding a PDCCH candidate upon receiving the earlier resource grid and can continue decoding the PDCCH candidate (e.g., on-the-fly) as later resource grids are received. In some aspects, an order of CCE indexes corresponds to the order in which corresponding CCEs occur in time. For example, the CCE that occurs earliest in time may have the lowest index as compared to other CCEs in the first CORESET, the CCE that occurs second earliest in time may have the second-lowest index, and so on up to the CCE that occurs latest in time (e.g., in the overlapping resource grid), which may have the highest index. In some aspects, the overlapping resource grid may include a CCE with a highest index regardless of the ordering of CCE index values of the non-overlapping resource grids. Because there may be some time delay between when all of the non-overlapping resource grids are received and when the overlapping resource grid is received, this may allow the UE 905 to process (e.g., begin decoding) a PDCCH candidate upon receiving all of the non-overlapping resource grids, and to finish decoding upon receiving the overlapping resource grid. This may reduce the delay associated with PDCCH candidate decoding and/or may reduce the amount of buffering performed by the UE 905.

As indicated above, FIG. 9 is provided as an example. Other examples may differ from what is described with regard to FIG. 9.

Figure 10:
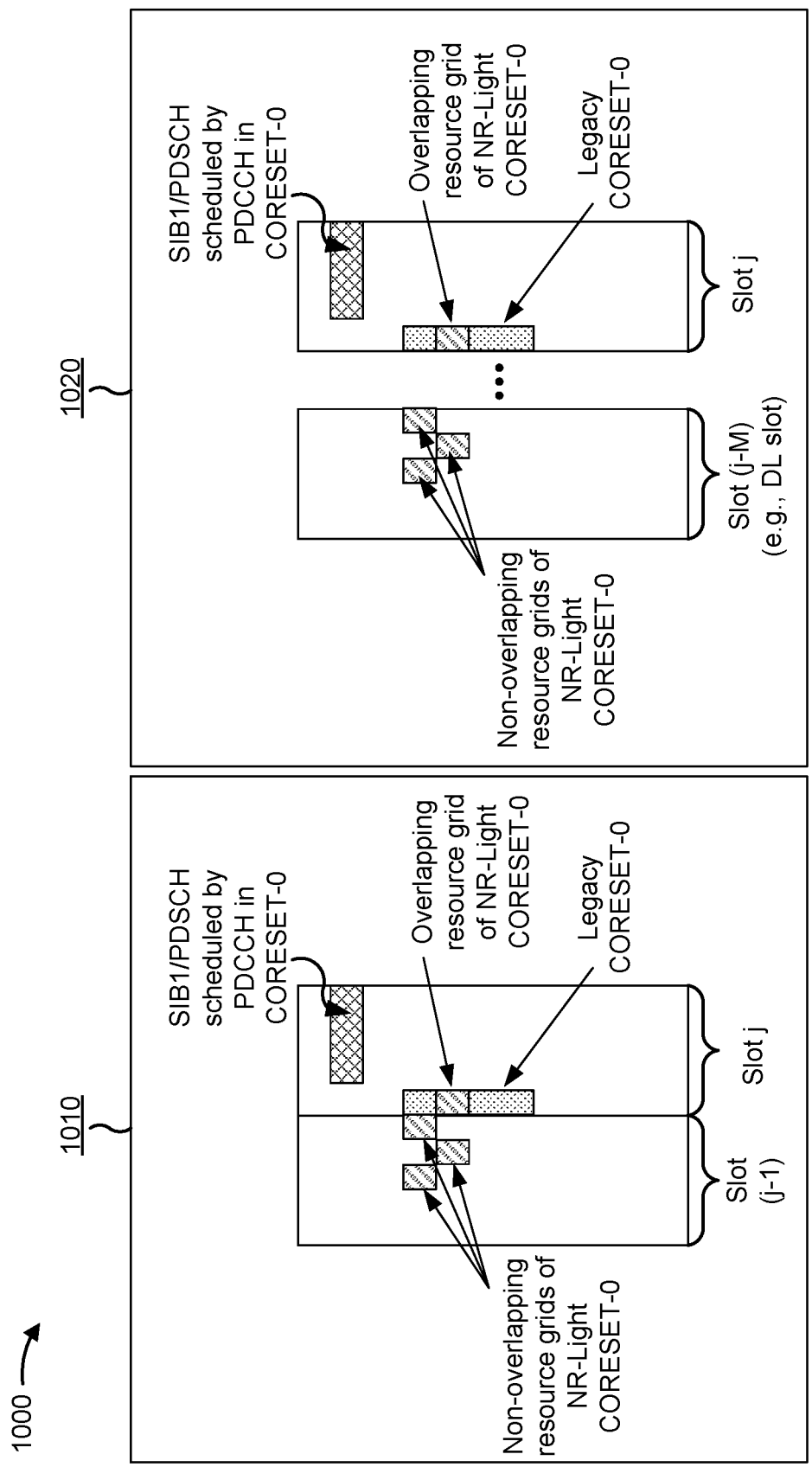

FIG. 10 is a diagram illustrating another example 1000 of configuration of a CORESET and CSS for initial access by low tier UEs, in accordance with various aspects of the present disclosure.

In a first configuration 1010, the non-overlapping resource grids (e.g., the time domain resources of the non-overlapping resource grids) may occur in a first slot, shown as slot j-1, and the legacy CORESET-0 may occur in a second slot, shown as slot j. Thus, in some aspects, the first slot that includes the non-overlapping resource grids may be one slot before the second slot that includes the legacy CORESET-0. In this way, the UE 905 can conserve UE resources by reducing a length of time that information in the non-overlapping resource grids needs to be stored in a buffer of the UE 905.

In a second configuration 1020, the non-overlapping resource grids (e.g., the time domain resources of the non-overlapping resource grids) may occur in a first slot, shown as slot j-M, and the legacy CORESET-0 may occur in a second slot, shown as slot j. Thus, in some aspects, the first slot that includes the non-overlapping resource grids may be a number of slots M before the second slot that includes the legacy CORESET-0. In the first configuration 1010, M is equal to one. As further shown, the first slot may be a downlink (DL) slot, such as a DL slot in a TDD UL/DL configuration of the base station 110 (e.g., a serving base station of the UE 905, described above in connection with FIG. 9). This avoids a configuration where the non-overlapping resource grids are configured to occur in an uplink slot, and therefore avoids a configuration where the UE 905 is unable to obtain the non-overlapping resource grids.

As shown in FIG. 10 (e.g., in both the first configuration 1010 and the second configuration 1020), the non-overlapping resource grids (e.g., the time domain resources of the non-overlapping resource grids) may occur at the end of the first slot, shown as the last three OFDM symbols of the first slot (e.g., where the number of OFDM symbols may depend on the number of time-division multiplexed non-overlapping resource grids). In this case, the non-overlapping resource grids may occur within a threshold number of OFDM symbols before the end of (e.g., an ending boundary of) the first slot. For example, the non-overlapping resource grids may occur within a threshold number of OFDM symbols prior to a starting OFDM symbol of a next consecutive slot after the first slot. In this way, the UE 905 can conserve UE resources by reducing a length of time that information in the non-overlapping resource grids needs to be stored in a buffer of the UE 905.

As indicated above, FIG. 10 is provided as an example. Other examples may differ from what is described with regard to FIG. 10.

Figure 11:
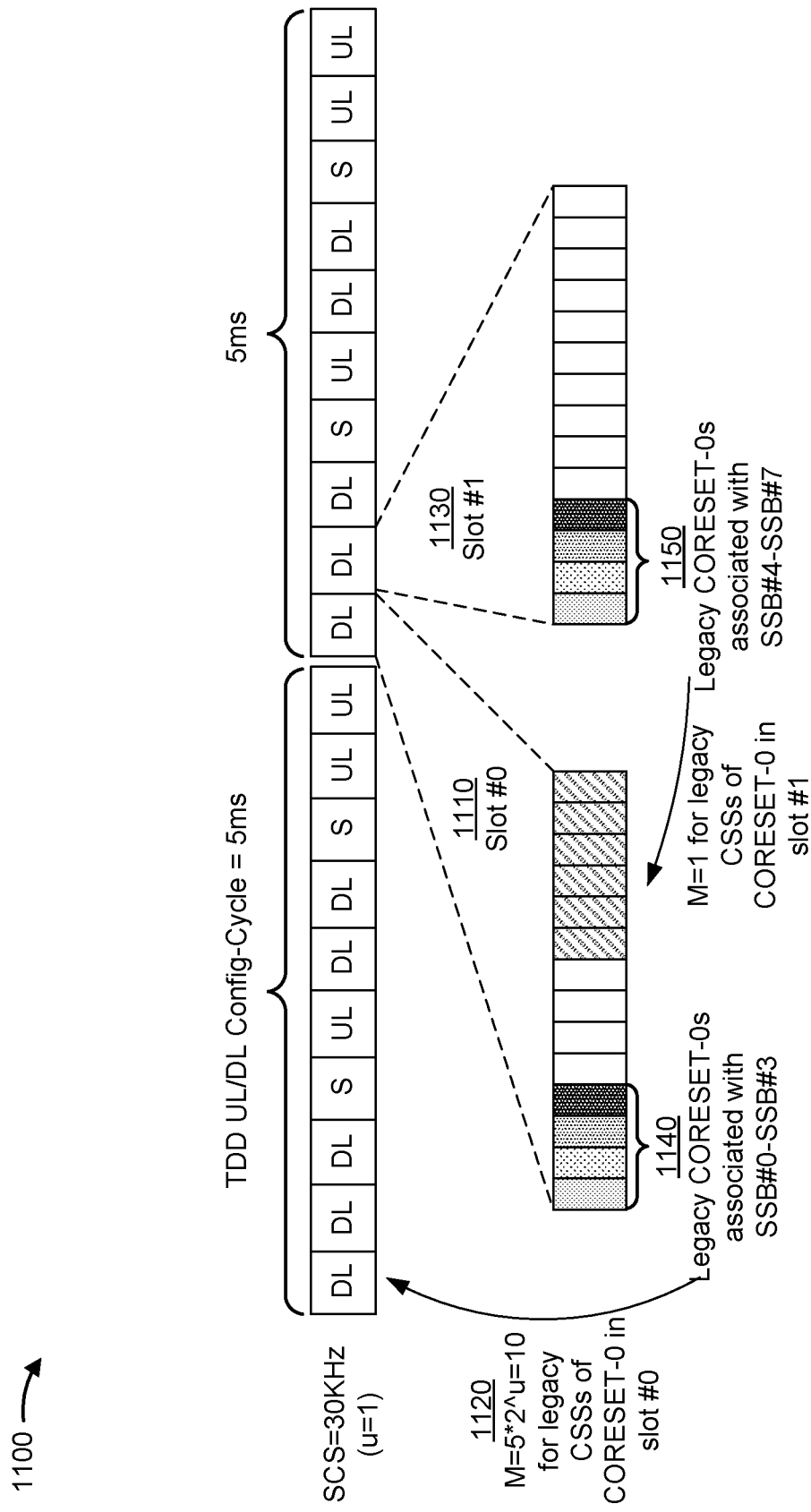

FIG. 11 is a diagram illustrating another example 1100 of configuration of a CORESET and CSS for initial access by low tier UEs, in accordance with various aspects of the present disclosure. FIG. 11 shows examples of determining a first slot that includes non-overlapping resource grids of a first CORESET (e.g., an NR-Light CORESET-0), where the first slot occurs a number of slots before a second slot that includes a second CORESET (e.g., a legacy CORESET-0).

In some aspects, the UE 905 and/or the base station 110 may determine the number of slots based at least in part on a TDD UL/DL configuration. In some aspects, the UE 905 may not be able to determine a TDD UL/DL configuration being used by the base station 110 until the UE 905 receives SIB1. Thus, in some aspects, the UE 905 may determine the number of slots based at least in part on a default TDD UL/DL configuration, which may be indicated in system information, may be specified according to a wireless communication standard, and/or the like. In some aspects, the UE 905 and/or the base station 110 may determine the number of slots based at least in part on a periodicity of the TDD UL/DL configuration (e.g., a default TDD UL/DL configuration). In some cases, an initial slot (e.g., slot 0) of multiple (e.g., all possible) TDD UL/DL configurations may be a DL slot. Thus, in this case, the first slot that includes the non-overlapping resource grids may be an initial slot of a TDD UL/DL configuration, and a time domain location of the initial slot may be determined based at least in part on a periodicity of the TDD UL/DL configuration (e.g., 5 ms, 10 ms, and/or the like). In some aspects, the periodicity may be a maximum periodicity permitted for TDD UL/DL configurations (e.g., which may be specified in a wireless communication standard). Additionally, or alternatively, the periodicity may be a periodicity (e.g., a default periodicity, a maximum periodicity, and/or the like) configured for the UE 905 based at least in part on a mobile network operator of the serving base station 110 of the UE 905.

In some aspects, the UE 905 and/or the base station 110 may determine the number of slots based at least in part on a frequency range in which the first CORESET and the first CSS are included (e.g., a sub-6 GHz frequency range, a millimeter wave frequency range, and/or the like). Additionally, or alternatively, the UE 905 and/or the base station 110 may determine the number of slots based at least in part on a numerology (e.g., a subcarrier spacing) associated with the PDCCH candidate (e.g., a numerology used for the PDCCH, for the first CORESET, for communications between the UE 905 and the base station 110, and/or the like). For example, for frequency range 1 (FR1) (e.g., sub-6 GHz), the number of slots M may be determined from the set $\{2, 5\} \times \times 2^u$, where u is the numerology index (e.g., the subcarrier spacing configuration index) of the PDCCH. For example, u may have a value of 0 (e.g., 15 kHz SCS), 1 (e.g., 30 kHz SCS), 2 (e.g., 60 kHz SCS), 3 (e.g., 120 kHz SCS), 4 (e.g., 240 kHz SCS), and/or the like. In this example, if u is equal to zero, then M is equal to 2 or 5, which indicates that a slot that is 2 slots earlier and/or a slot that is 5 slots earlier than the slot that includes the legacy CORESET-0 is a DL slot. By determining the number of slots M in this manner, the UE 905 can account for different symbol durations, used for different numerologies, to identify a DL slot for the non-overlapping resource grids. As another example, for FR2 (e.g., millimeter wave), the number of slots M may be determined from the set $\{2.5, 5, 7.5\} \times 2 \times u$.

Additionally, or alternatively, the UE 905 and/or the base station 110 may determine the number of slots based at least in part on a slot index of the second slot that includes the second CORESET and the second CSS. For example, as shown by reference number 1110, if the legacy CORESET-0 occurs in slot #0 (e.g., a slot having a slot index of 0), then the slot that is one slot earlier than slot #0 (e.g., slot #9 of the prior TDD UL/DL configuration cycle) may be an uplink slot. In this case, the number of slots M may be greater than one. In example 1100, if the slot index of the second slot is zero, then M is greater than one. As shown by reference number 1120, in example 1100, the number of slots M is determined by $M=5 \times 2^u=10$ (e.g., where u=1 for an SCS of 30 kHz). In this case, the first slot that includes the non-overlapping resource grids occurs 10 slots before the second slot that includes the legacy CORESET-0. As shown, the first slot is an initial slot of a TDD UL/DL configuration cycle that precedes the TDD UL/DL configuration cycle that includes the second slot, and the first slot is a DL slot.

As shown by reference number 1130, if the legacy CORESET-0 occurs in slot #1 (e.g., a slot having a slot index of 1), then the slot that is one slot earlier than slot #1 (e.g., slot #0 of the same TDD UL/DL configuration cycle) may be a downlink slot. In this case, the number of slots M may be equal to one. In example 1100, if the slot index of the second slot is one, then M is equal to one. In this case, the non-overlapping resource grids occur at the end of slot #0 in the same TDD UL/DL configuration cycle as slot #1.

Additionally, or alternatively, the UE 905 and/or the base station 110 may determine the number of slots based at least in part on one or more SSB indexes associated with the legacy CORESET-0 and the legacy CSS. For example, as shown by reference number 1140, if the legacy CORESET-0 and the legacy CSS are associated with SSB indexes 0 through 3, then the number of slots M is greater than one (e.g., as described above). As shown by reference number 1150, if the legacy CORESET-0 and the legacy CSS are associated with SSB indexes 4 through 7, then the number of slots M is equal to one.

By determining the number of slots M as described herein, the UE 905 and the base station 110 may ensure that the non-overlapping resource grids are transmitted and received in a downlink slot, and therefore avoid a configuration where the UE 905 is unable to obtain the non-overlapping resource grids (e.g., if the non-overlapping resource grids were to occur in an uplink slot). Furthermore, resources of the UE 905 (e.g., processing resources, memory resources, battery power, and/or the like) may be conserved by reducing a length of time that information in the non-overlapping resource grids needs to be stored in a buffer of the UE 905.

As indicated above, FIG. 11 is provided as an example. Other examples may differ from what is described with regard to FIG. 11.

Figure 12:
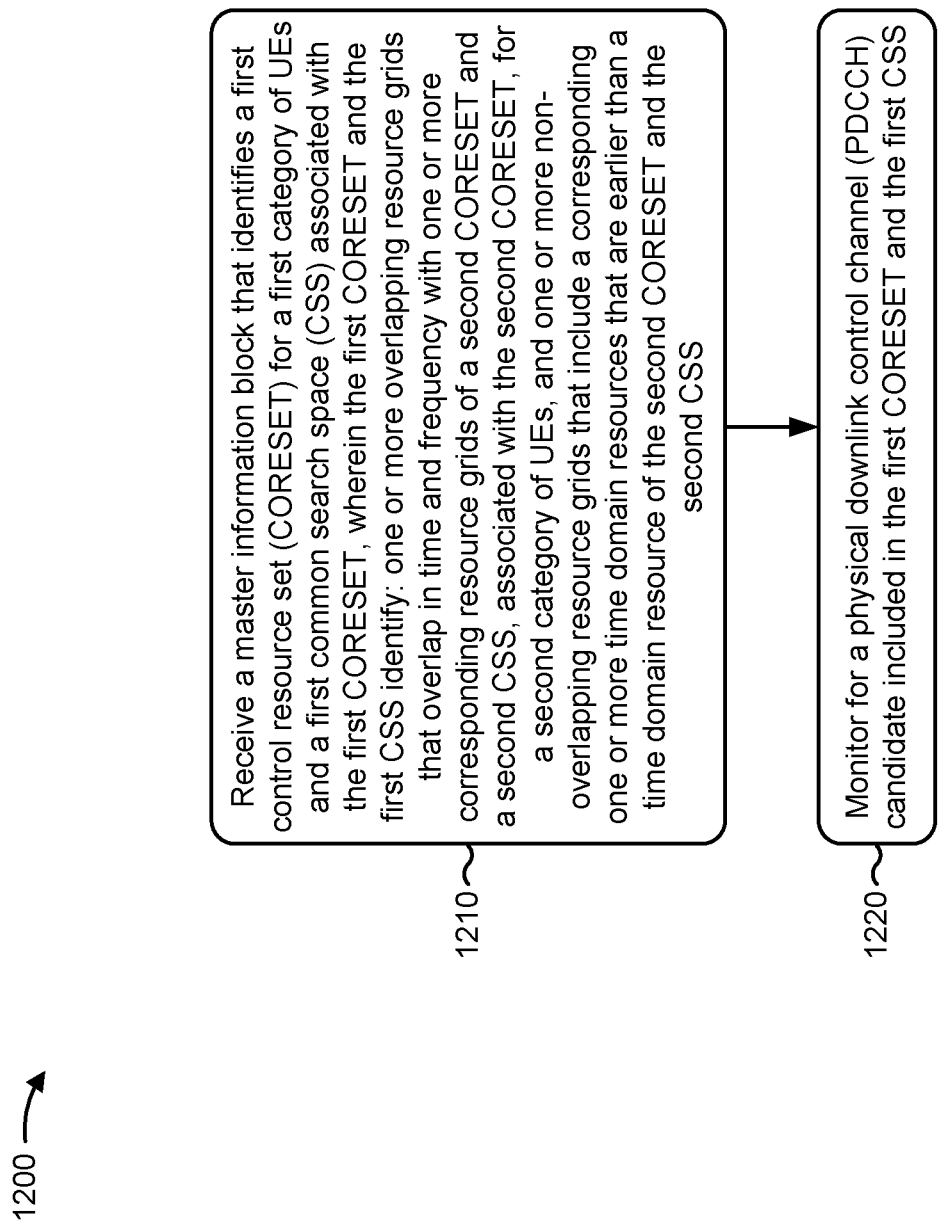
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120, UE 905, and/or the like) performs operations associated with configuration of a CORESET and CSS for initial access by low tier UEs.

As shown in FIG. 12, in some aspects, process 1200 may include receiving a master information block that identifies a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS (block 1210). For example, the UE (e.g., using receive processor 258, controller/processor 280, memory 282, and/or the like) may receive a master information block that identifies a first CORESET for a first category of UEs and a first CSS associated with the first CORESET, as described above. In some aspects, the first CORESET and the first CSS identify one or more overlapping resource grids that overlap in time and frequency with one or more corresponding resource grids of a second CORESET and a second CSS, associated with the second CORESET, for a second category of UEs. In some aspects, the first CORESET and the first CSS identify one or more non-overlapping resource grids that include a corresponding one or more time domain resources that are earlier than a time domain resource of the second CORESET and the second CSS.

As further shown in FIG. 12, in some aspects, process 1200 may include monitoring for a PDCCH candidate included in the first CORESET and the first CSS (block 1220). For example, the UE (e.g., using receive processor 258, controller/processor 280, memory 282, and/or the like) may monitor for a PDCCH candidate included in the first CORESET and the first CSS, as described above.

Process 1200 may include additional aspects, such as any single aspect or any combination of aspects described below and/or in connection with one or more other processes described elsewhere herein.

In a first aspect, the corresponding one or more time domain resources are within a first slot that is a number of slots before a second slot that includes the time domain resource of the second CORESET and the second CSS.

In a second aspect, alone or in combination with the first aspect, the corresponding one or more time domain resources are within a threshold number of orthogonal frequency division multiplexing (OFDM) symbols prior to a starting OFDM symbol of a next consecutive slot after the first slot.

In a third aspect, alone or in combination with one or more of the first and second aspects, the number of slots is one slot.

In a fourth aspect, alone or in combination with one or more of the first through third aspects, the first slot is a downlink slot in any time-division duplex uplink/downlink configurations used by a serving base station.

In a fifth aspect, alone or in combination with one or more of the first through fourth aspects, the number of slots is determined based at least in part on a periodicity of a time-division duplex uplink/downlink configuration.

In a sixth aspect, alone or in combination with one or more of the first through fifth aspects, the number of slots is determined based at least in part on a frequency range in which the first CORESET and the first CSS are included.

In a seventh aspect, alone or in combination with one or more of the first through sixth aspects, the number of slots is determined based at least in part on a numerology or a sub-carrier spacing associated with the PDCCH candidate.

In an eighth aspect, alone or in combination with one or more of the first through seventh aspects, the number of slots is determined based at least in part on a slot index of the second slot that includes the time domain resource of the second CORESET and the second CSS.

In a ninth aspect, alone or in combination with one or more of the first through eighth aspects, the number of slots is greater than one if a slot that is one slot earlier than the second slot is an uplink slot, and the slot that is one slot earlier than the second slot is identified based at least in part on the slot index of the second slot.

In a tenth aspect, alone or in combination with one or more of the first through ninth aspects, the number of slots is equal to one if a slot that is one slot earlier than the second slot is a downlink slot, and the slot that is one slot earlier than the second slot is identified based at least in part on the slot index of the second slot.

In an eleventh aspect, alone or in combination with one or more of the first through tenth aspects, the number of slots is determined based at least in part on a synchronization signal block index associated with the second CORESET.

In a twelfth aspect, alone or in combination with one or more of the first through eleventh aspects, a first resource grid, of the one or more non-overlapping resource grids, includes a control channel element with a lower index than an index of a second resource grid, of the one or more non-overlapping resource grids or the one or more overlapping resource grids, that occurs later in time than the first resource grid.

In a thirteenth aspect, alone or in combination with one or more of the first through twelfth aspects, each resource grid, of the one or more non-overlapping resource grids and the one or more overlapping resource grids, includes one or more resource element groups of at least one control channel element of the first CORESET.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
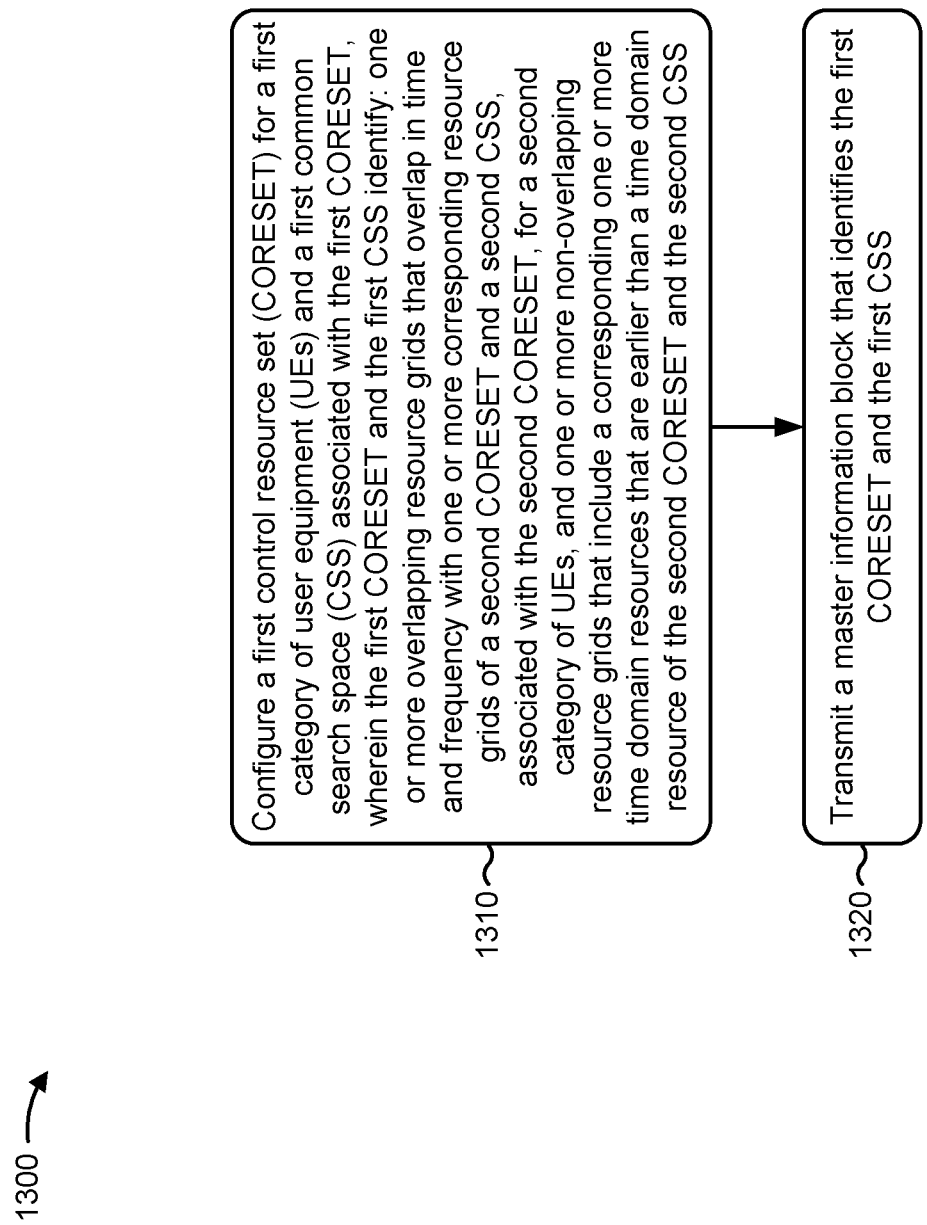
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a base station (e.g., base station 110 and/or the like) performs operations associated with configuration of a CORESET and CSS for initial access by low tier UEs.

As shown in FIG. 13, in some aspects, process 1300 may include configuring a first CORESET for a first category of UEs and a first CSS associated with the first CORESET, wherein the first CORESET and the first CSS identify: one or more overlapping resource grids that overlap in time and frequency with one or more corresponding resource grids of a second CORESET and a second CSS, associated with the second CORESET, for a second category of UEs, and one or more non-overlapping resource grids that include a corresponding one or more time domain resources that are earlier than a time domain resource of the second CORESET and the second CSS (block 1310). For example, the base station (e.g., using transmit processor 220, controller/processor 240, memory 242, and/or the like) may configure a first CORESET for a first category of UEs and a first CSS associated with the first CORESET, as described above. In some aspects, the first CORESET and the first CSS may identify one or more overlapping resource grids that overlap in time and frequency with one or more corresponding resource grids of a second CORESET and a second CSS, associated with the second CORESET, for a second category of UEs. In some aspects, In some aspects, the first CORESET and the first CSS may identify one or more non-overlapping resource grids that include a corresponding one or more time domain resources that are earlier than a time domain resource of the second CORESET and the second CSS.

As further shown in FIG. 13, in some aspects, process 1300 may include transmitting a master information block that identifies the first CORESET and the first CSS (block 1320). For example, the base station (e.g., using transmit processor 220, controller/processor 240, memory 242, and/or the like) may transmit a master information block that identifies the first CORESET and the first CSS, as described above.

Process 1300 may include additional aspects, such as any single aspect or any combination of aspects described below and/or in connection with one or more other processes described elsewhere herein.

In a first aspect, process 1300 includes transmitting one or more physical downlink control channel communications in the first CORESET and the first CSS.

In a second aspect, alone or in combination with the first aspect, the corresponding one or more time domain resources are within a first slot that is a number of slots before a second slot that includes the time domain resource of the second CORESET and the second CSS.

In a third aspect, alone or in combination with one or more of the first and second aspects, the corresponding one or more time domain resources are within a threshold number of OFDM symbols prior to a starting OFDM symbol of a next consecutive slot after the first slot.

In a fourth aspect, alone or in combination with one or more of the first through third aspects, the number of slots is one slot.

In a fifth aspect, alone or in combination with one or more of the first through fourth aspects, the first slot is a downlink slot in any time-division duplex uplink/downlink configurations used by the base station.

In a sixth aspect, alone or in combination with one or more of the first through fifth aspects, the number of slots is determined based at least in part on a periodicity of a time-division duplex uplink/downlink configuration.

In a seventh aspect, alone or in combination with one or more of the first through sixth aspects, the number of slots is determined based at least in part on a frequency range in which the first CORESET and the first CSS are included.

In an eighth aspect, alone or in combination with one or more of the first through seventh aspects, the number of slots is determined based at least in part on a numerology or a sub-carrier spacing associated with the PDCCH candidate.

In a ninth aspect, alone or in combination with one or more of the first through eighth aspects, the number of slots is determined based at least in part on a slot index of the second slot that includes the time domain resource of the second CORESET and the second CSS.

In a tenth aspect, alone or in combination with one or more of the first through ninth aspects, the number of slots is greater than one if a slot that is one slot earlier than the second slot is an uplink slot, and the slot that is one slot earlier than the second slot is identified based at least in part on the slot index of the second slot.

In an eleventh aspect, alone or in combination with one or more of the first through tenth aspects, the number of slots is equal to one if a slot that is one slot earlier than the second slot is a downlink slot, and the slot that is one slot earlier than the second slot is identified based at least in part on the slot index of the second slot.

In a twelfth aspect, alone or in combination with one or more of the first through eleventh aspects, the number of slots is determined based at least in part on a synchronization signal block index associated with the second CORESET.

In a thirteenth aspect, alone or in combination with one or more of the first through twelfth aspects, a first resource grid, of the one or more non-overlapping resource grids, includes a control channel element with a lower index than an index of a second resource grid, of the one or more non-overlapping resource grids or the one or more overlapping resource grids, that occurs later in time than the first resource grid.

In a fourteenth aspect, alone or in combination with one or more of the first through thirteenth aspects, each resource grid, of the one or more non-overlapping resource grids and the one or more overlapping resource grids, includes one or more resource element groups of at least one control channel element of the first CORESET.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a master information block that identifies a first control resource set (CORESET) for a first category of UEs and a first common search space (CSS) associated with the first CORESET, wherein the first CORESET and the first CSS identify:
        one or more overlapping resource grids that overlap in time and frequency with one or more corresponding resource grids of a second CORESET and a second CSS, associated with the second CORESET, for a second category of UEs, and
        one or more non-overlapping resource grids that include a corresponding one or more time domain resources that are earlier than a time domain resource of the second CORESET and the second CSS; and
    monitoring for a physical downlink control channel (PDCCH) candidate included in the first CORESET and the first CSS.

2. The method of claim 1, wherein the corresponding one or more time domain resources are within a first slot that is a number of slots before a second slot that includes the time domain resource of the second CORESET and the second CSS.

3. The method of claim 2, wherein the corresponding one or more time domain resources are within a threshold number of orthogonal frequency division multiplexing (OFDM) symbols prior to a starting OFDM symbol of a next consecutive slot after the first slot.

4. The method of claim 2, wherein the number of slots is one slot.

5. The method of claim 2, wherein the first slot is a downlink slot in any time-division duplex uplink/downlink configuration used by a serving base station.

6. The method of claim 2, wherein the number of slots is determined based at least in part on a periodicity of a time-division duplex uplink/downlink configuration.

7. The method of claim 2, wherein the number of slots is determined based at least in part on a frequency range in which the first CORESET and the first CSS are included.

8. The method of claim 2, wherein the number of slots is determined based at least in part on a numerology or a sub-carrier spacing associated with the PDCCH candidate.

9. The method of claim 2, wherein the number of slots is determined based at least in part on a slot index of the second slot that includes the time domain resource of the second CORESET and the second CSS.

10. The method of claim 9, wherein the number of slots is greater than one if a slot that is one slot earlier than the second slot is an uplink slot, wherein the slot that is one slot earlier than the second slot is identified based at least in part on the slot index of the second slot.

11. The method of claim 9, wherein the number of slots is equal to one if a slot that is one slot earlier than the second slot is a downlink slot, wherein the slot that is one slot earlier than the second slot is identified based at least in part on the slot index of the second slot.

12. The method of claim 2, wherein the number of slots is determined based at least in part on a synchronization signal block index associated with the second CORESET.

13. The method of claim 1, wherein a first resource grid, of the one or more non-overlapping resource grids, includes a control channel element with a lower index than an index of a second resource grid, of the one or more non-overlapping resource grids or the one or more overlapping resource grids, that occurs later in time than the first resource grid.

14. The method of claim 1, wherein each resource grid, of the one or more non-overlapping resource grids and the one or more overlapping resource grids, includes one or more resource element groups of at least one control channel element of the first CORESET.

15. A method of wireless communication performed by a base station, comprising:
    configuring a first control resource set (CORESET) for a first category of user equipment (UEs) and a first common search space (CSS) associated with the first CORESET, wherein the first CORESET and the first CSS identify:
        one or more overlapping resource grids that overlap in time and frequency with one or more corresponding resource grids of a second CORESET and a second CSS, associated with the second CORESET, for a second category of UEs, and
        one or more non-overlapping resource grids that include a corresponding one or more time domain resources that are earlier than a time domain resource of the second CORESET and the second CSS; and transmitting a master information block that identifies the first CORESET and the first CSS.

16. The method of claim 15, further comprising transmitting one or more physical downlink control channel communications in the first CORESET and the first CSS.

17. The method of claim 15, wherein the corresponding one or more time domain resources are within a first slot that is a number of slots before a second slot that includes the time domain resource of the second CORESET and the second CSS.

18. The method of claim 17, wherein the corresponding one or more time domain resources are within a threshold number of orthogonal frequency division multiplexing (OFDM) symbols prior to a starting OFDM symbol of a next consecutive slot after the first slot.

19. The method of claim 17, wherein the number of slots is one slot.

20. The method of claim 17, wherein the first slot is a downlink slot in any time-division duplex uplink/downlink configuration used by the base station.

21. The method of claim 17, wherein the number of slots is determined based at least in part on a periodicity of a time-division duplex uplink/downlink configuration or based at least in part on a frequency range in which the first CORESET and the first CSS are included.

22. The method of claim 17, wherein the number of slots is determined based at least in part on a numerology or a sub-carrier spacing associated with a physical downlink control channel associated with the first CORESET.

23. The method of claim 17, wherein the number of slots is determined based at least in part on a slot index of the second slot that includes the time domain resource of the second CORESET and the second CSS.

24. The method of claim 23, wherein the number of slots is greater than one if a slot that is one slot earlier than the second slot is an uplink slot, wherein the slot that is one slot earlier than the second slot is identified based at least in part on the slot index of the second slot.

25. The method of claim 23, wherein the number of slots is equal to one if a slot that is one slot earlier than the second slot is a downlink slot, wherein the slot that is one slot earlier than the second slot is identified based at least in part on the slot index of the second slot.

26. The method of claim 17, wherein the number of slots is determined based at least in part on a synchronization signal block index associated with the second CORESET.

27. The method of claim 15, wherein a first resource grid, of the one or more non-overlapping resource grids, includes a control channel element with a lower index than an index of a second resource grid, of the one or more non-overlapping resource grids or the one or more overlapping resource grids, that occurs later in time than the first resource grid.

28. The method of claim 15, wherein each resource grid, of the one or more non-overlapping resource grids and the one or more overlapping resource grids, includes one or more resource element groups of at least one control channel element of the first CORESET.

29. A user equipment (UE) for wireless communication, comprising:
a memory; and
one or more processors operatively coupled to the memory, the one or more processors configured to:
receive a master information block that identifies a first control resource set (CORESET) for a first category of UEs and a first common search space (CSS) associated with the first CORESET, wherein the first CORESET and the first CSS identify:
one or more overlapping resource grids that overlap in time and frequency with one or more corresponding resource grids of a second CORESET and a second CSS, associated with the second CORESET, for a second category of UEs, and
one or more non-overlapping resource grids that include a corresponding one or more time domain resources that are earlier than a time domain resource of the second CORESET and the second CSS; and
monitor for a physical downlink control channel (PDCCH) candidate included in the first CORESET and the first CSS.

30. A base station for wireless communication, comprising:
a memory; and
one or more processors operatively coupled to the memory, the one or more processors configured to:
configure a first control resource set (CORESET) for a first category of user equipment (UEs) and a first common search space (CSS) associated with the first CORESET, wherein the first CORESET and the first CSS identify:
one or more overlapping resource grids that overlap in time and frequency with one or more corresponding resource grids of a second CORESET and a second CSS, associated with the second CORESET, for a second category of UEs, and
one or more non-overlapping resource grids that include a corresponding one or more time domain resources that are earlier than a time domain resource of the second CORESET and the second CSS; and
transmit a master information block that identifies the first CORESET and the first CSS.

* * * * *